United States Patent
Weigle

(10) Patent No.: US 10,442,405 B2
(45) Date of Patent: Oct. 15, 2019

(54) PROCESSING CAPTURED VEHICLE FLUID

(71) Applicant: BRIMTECH, LLC, Houston, TX (US)

(72) Inventor: James K Weigle, Lake Jackson, TX (US)

(73) Assignee: BRIMTECH, LLC, Lake Jackson, TX (US)

(*) Notice: Subject to any disclaimer, the term of this patent is extended or adjusted under 35 U.S.C. 154(b) by 246 days.

(21) Appl. No.: 15/524,259

(22) PCT Filed: Nov. 9, 2015

(86) PCT No.: PCT/US2015/059758
§ 371 (c)(1),
(2) Date: May 3, 2017

(87) PCT Pub. No.: WO2016/077238
PCT Pub. Date: May 19, 2016

(65) Prior Publication Data
US 2018/0319375 A1    Nov. 8, 2018

Related U.S. Application Data

(60) Provisional application No. 62/077,425, filed on Nov. 10, 2014, provisional application No. 62/104,324, filed on Jan. 16, 2015.

(51) Int. Cl.
| | |
|---|---|
| *B60S 1/48* | (2006.01) |
| *B60R 16/08* | (2006.01) |
| *B60S 1/50* | (2006.01) |
| *B60W 10/00* | (2006.01) |
| *B60W 20/15* | (2016.01) |
| *B60W 10/30* | (2006.01) |

(52) U.S. Cl.
CPC .............. *B60S 1/483* (2013.01); *B60R 16/08* (2013.01); *B60S 1/481* (2013.01); *B60S 1/488* (2013.01); *B60S 1/50* (2013.01); *B60W 10/00* (2013.01); *B60W 10/30* (2013.01); *B60W 20/15* (2016.01)

(58) Field of Classification Search
CPC .. C02F 2201/008; C02F 2209/42; B60S 1/50; B60S 1/481; B60S 1/46; B60S 1/48
USPC .......................................... 210/744; 137/558
See application file for complete search history.

(56) References Cited

U.S. PATENT DOCUMENTS

| | | |
|---|---|---|
| 5,435,151 A | 7/1995 | Han |
| 5,651,259 A | 7/1997 | Twyman |
| 8,865,002 B2 | 10/2014 | Weigle et al. |
| 2008/0267812 A1 | 10/2008 | Kawachi et al. |
| 2010/0025311 A1 | 2/2010 | Jones et al. |
| 2011/0089120 A1* | 4/2011 | Weigle ............... B60S 1/50 210/744 |

(Continued)

*Primary Examiner* — Claire A Norris
(74) *Attorney, Agent, or Firm* — The Compton Law Firm, P.C.; Scott D. Compton

(57) ABSTRACT

The present application is directed to a system and method for processing fluid captured from a vehicle surface and routing the fluid to one or more fluid reservoirs of the vehicle. The system includes one or more reservoirs for storing captured fluid and one or more reservoirs for storing chemical based fluids such as antifreeze fluids. The system is operationally configured to convey chemical based fluid to the captured fluid reservoir(s) according to one or more preset ambient temperatures of the system prior to routing fluid to one or more fluid reservoirs of the vehicle.

17 Claims, 16 Drawing Sheets

(56) References Cited

U.S. PATENT DOCUMENTS

2013/0263956 A1   10/2013   Gaertner et al.

* cited by examiner

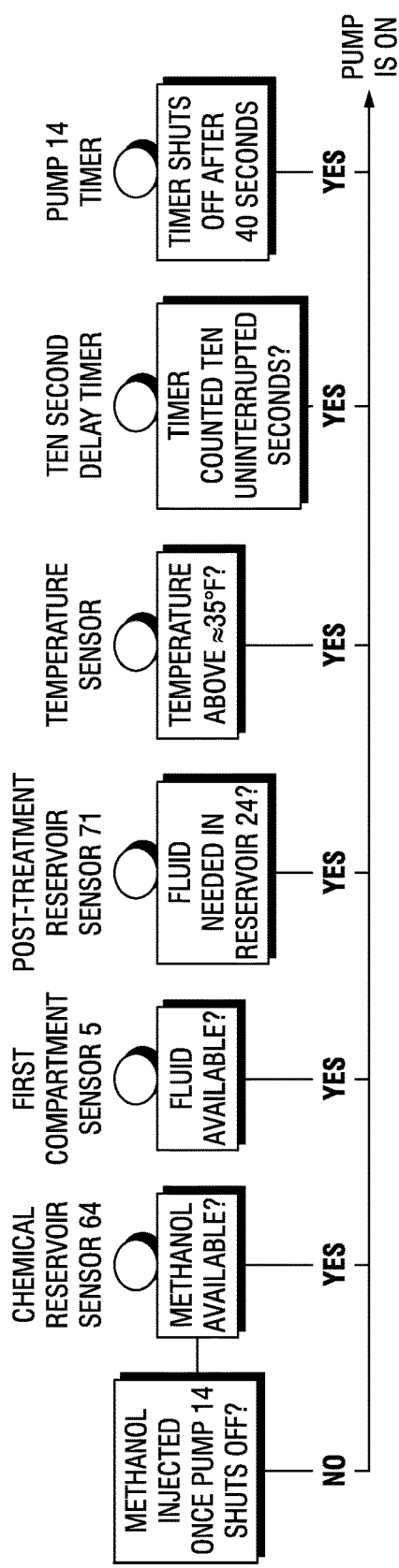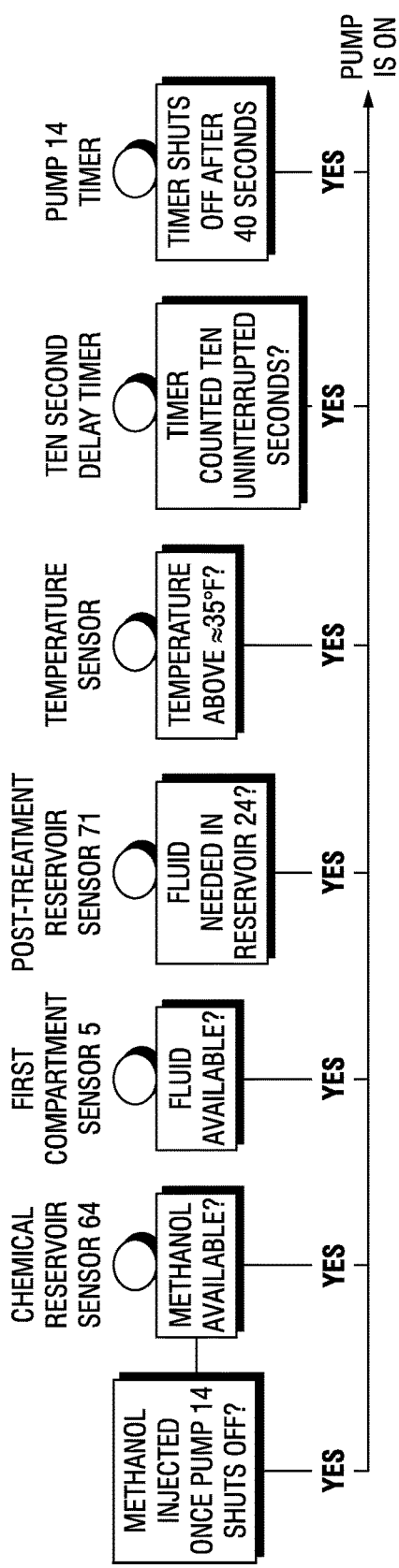
FIG. 11
FIG. 12

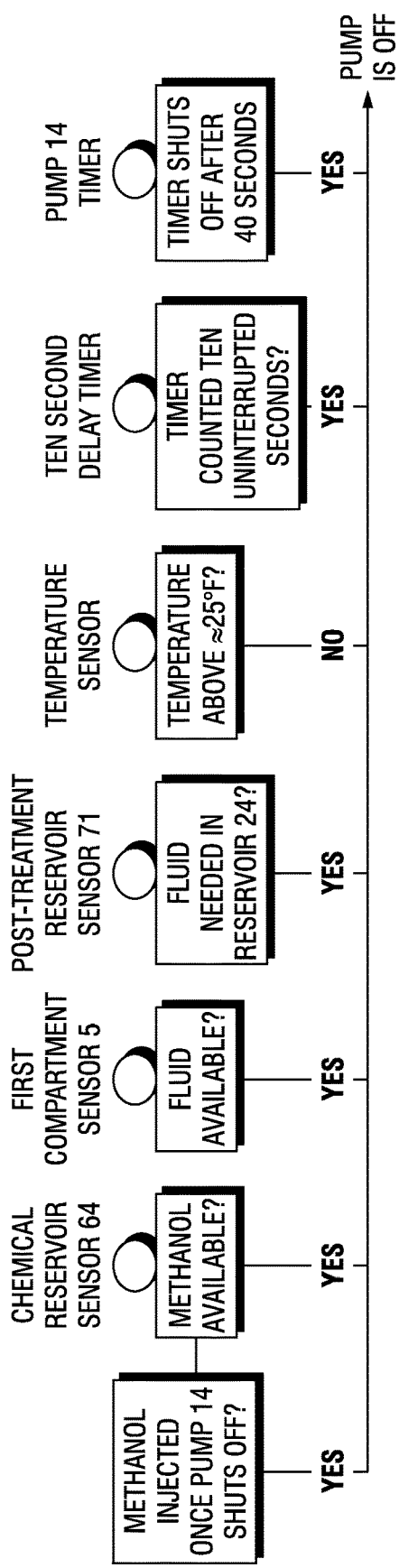

PROCESSING CAPTURED VEHICLE FLUID

CROSS-REFERENCE TO RELATED APPLICATIONS

The application is entitled to the benefit of the filing date of the prior-filed U.S. Provisional Application No. 62/077,425, filed on Nov. 10, 2014 and U.S. Provisional Application No. 62/104,324, filed on Jan. 16, 2015.

STATEMENT REGARDING FEDERALLY SPONSORED RESEARCH OR DEVELOPMENT

Not applicable.

FIELD OF THE INVENTION

The application relates generally to processing captured vehicle fluid for future use thereof.

BACKGROUND

Vehicles such as automobiles are often equipped with fluid reservoirs such as windshield wiper fluid reservoirs, radiator overflow reservoirs and the like. Depending on the type of vehicle and/or fluid composition(s) being used, a particular fluid reservoir may require periodic refilling as existing fluid is used up and/or varying as ambient weather conditions change. Simply refilling fluid reservoirs with water that is captured from vehicular condensation may be sufficient in particular instances. However, water is often times an insufficient refill fluid for certain vehicle reservoir purposes, including when the ambient temperature reaches freezing and below. Therefore, a need exists for capturing condensate fluid from a vehicle, treating the fluid to provide one or more desired fluid product(s), and delivering the fluid product(s) to one or more specified vehicular fluid reservoir(s) for further use as desired.

BRIEF SUMMARY OF THE INVENTION

The present application is directed to a system for processing fluid captured from a vehicle surface comprising (a) a fluid reservoir assembly for (1) capturing, storing and conveying fluid captured from the vehicle surface and (2) measuring the ambient temperature of the system; (b) a chemical reservoir assembly in fluid communication with the fluid reservoir assembly for storing one or more chemical based fluids and conveying a measurable volume of the one or more chemical based fluids to the fluid reservoir assembly to provide a fluid mixture therein according to one or more ambient temperatures of the system and the fluid volume of the fluid reservoir assembly; (c) one or more post-treatment reservoir assemblies in fluid communication with the fluid reservoir assembly for receiving, storing and discharging fluid received from the fluid reservoir assembly; and (d) control circuitry in electrical communication with a power source of the vehicle and with the fluid reservoir assembly, the chemical reservoir assembly and the one or more post-treatment reservoir assemblies, the control circuitry being operationally configured to safeguard the system against non-requested operation and provide one or more fluid mixtures according to the volume of fluid in each of the reservoirs and the ambient temperature of the system.

The present application is also directed to a system for processing fluid captured from a vehicle surface comprising (a) a fluid reservoir assembly operationally configured to capture and store captured fluid, the fluid reservoir assembly including (1) a fluid storage compartment including a fluid valve operationally configured to control the flow of fluid into the fluid storage compartment and prevent fluid flow out of the fluid storage compartment, (2) a fluid circulation member operationally configured to convey fluid out from the fluid storage compartment, (3) a fluid volume sensor system in electrical communication with the fluid circulation member and operationally configured to identify the fluid volume in the fluid storage compartment and (4) a temperature sensor for measuring the ambient temperature of the system; (b) a chemical reservoir assembly operationally configured to store one or more chemical based fluids and convey the same to the fluid storage compartment, the chemical reservoir assembly having one or more fluid volume sensors operationally configured to identify the volume of the one or more chemical based fluids; (c) a post-treatment reservoir assembly in fluid communication with the fluid reservoir assembly for receiving, storing and discharging fluid received from the fluid reservoir assembly, the post-treatment reservoir assembly having one or more fluid volume sensors operationally configured to identify the fluid volume within the post-treatment reservoir assembly; and (d) control circuitry in electrical communication with the fluid reservoir assembly, chemical reservoir assembly and the post-treatment reservoir assembly, the control circuitry being operationally configured to safeguard the system against non-requested operation of the fluid reservoir assembly, chemical reservoir assembly according to the fluid volume of each of the reservoirs and the ambient temperature of the system; the system being powered by a power source originating from the vehicle.

The present application is also directed to a method of providing an antifreeze fluid mixture for vehicular use, comprising (a) providing an electrically powered system including (1) one or more downstream fluid reservoir assemblies providing fluid for vehicular use, (2) a first upstream fluid reservoir assembly for capturing and storing vehicular produced condensate, the first upstream fluid reservoir being in fluid communication with the one or more downstream fluid reservoir assemblies, (3) a second upstream fluid reservoir assembly in fluid communication with the first upstream fluid reservoir assembly for storing one or more antifreeze fluids, (4) an electrical system operationally configured to control fluid flow between the reservoirs of the assemblies according to the volume of fluid in each of the reservoirs and the ambient temperature of the system; (b) capturing air conditioner condensate; (c) upon the electrical system realizing one or more preset ambient trigger temperatures, when the second upstream fluid reservoir assembly has a requisite volume of one or more antifreeze fluids stored therein, the electrical system (1) directing the second upstream fluid reservoir assembly to convey a volume of one or more antifreeze fluids to the first upstream fluid reservoir assembly to provide an antifreeze fluid mixture including condensate and (2) directing the one or more downstream fluid reservoir assemblies to discharge a volume of fluid; and (d) conveying the antifreeze fluid mixture to the one or more downstream fluid reservoir assemblies.

BRIEF DESCRIPTION OF THE SEVERAL VIEWS OF THE DRAWING

FIG. 11 is a simplified chart representative of a system operative at temperatures above about 7.2 degrees Celsius (45.0 degrees Fahrenheit).

FIG. 12 is a simplified chart representative of a system operative at temperatures above about 1.7 degrees Celsius (35.0 degrees Fahrenheit) and below about 7.2 degrees Celsius (45.0 degrees Fahrenheit).

FIG. 15 is a simplified chart representative of a system operative at temperatures below about −31.7 degrees Celsius (−25.0 degrees Fahrenheit) with antifreeze, e.g., methanol, available.

FIG. 16A is a simplified chart showing a system operative at temperatures below about 7.2 degrees Celsius (45.0 degrees Fahrenheit) and above about −31.7 degrees Celsius (−25.0 degrees Fahrenheit) with antifreeze available and a post-treatment reservoir operationally configured to dump fluid there from.

FIG. 17A is a simplified chart showing a system operative at temperatures below about 7.2 degrees Celsius (45.0 degrees Fahrenheit) and above about −31.7 degrees Celsius (−25.0 degrees Fahrenheit) with antifreeze available and a post-treatment reservoir not operationally configured to dump fluid there from.

DESCRIPTION OF THE INVENTION

Figure 1:
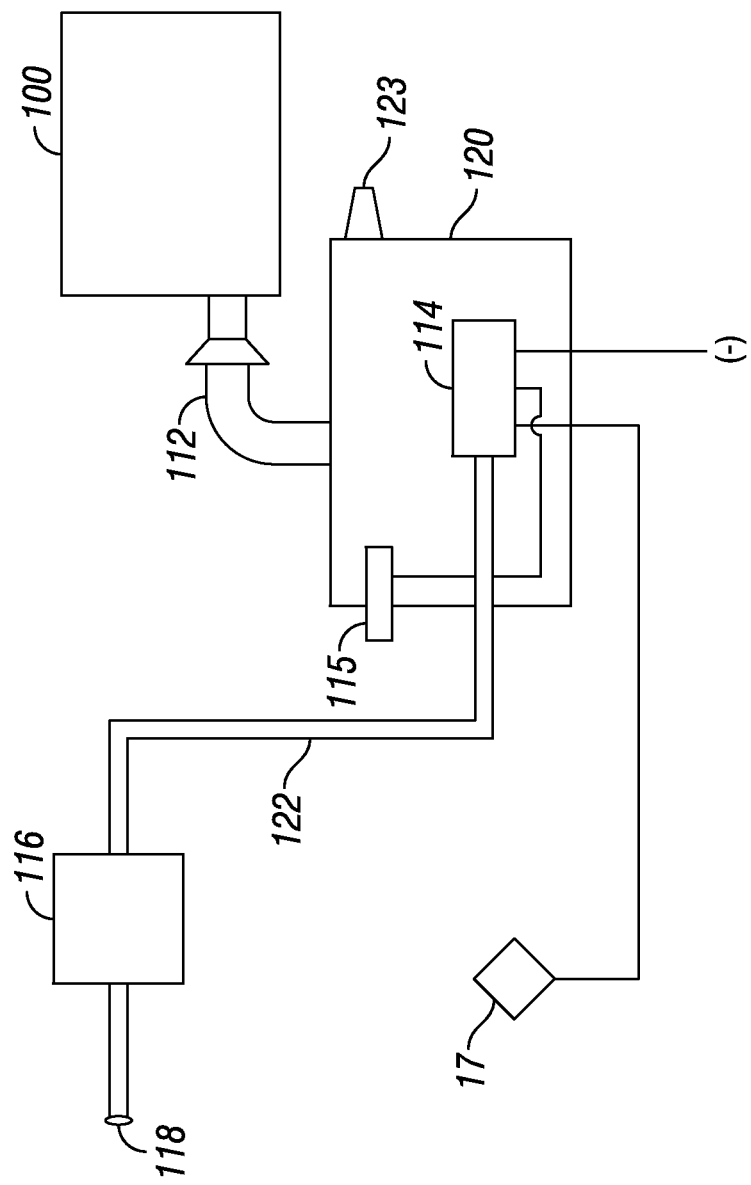
FIG. 1 shows an exemplary system for processing captured vehicular fluid.

It has been discovered that one or more fluids may be captured from various surfaces, compartments and drains of a vehicle and processed or treated in a manner effective to provide fluid for future constructive vehicular use in all weather conditions, including freezing and subfreezing temperatures. For example, processed fluid may be used to replenish existing vehicular fluid reservoirs such as windshield washer fluid reservoirs and radiator reservoirs, provide potable water, provide water for consumption by on-board electrolyzers for producing hydrogen, and combinations thereof. Captured fluid may also be processed for one or more uses separate and apart from vehicle use.

Before describing the invention in detail, it is to be understood that the invention is not limited to particular embodiments. It is also to be understood that the terminology used herein is for the purpose of describing particular embodiments only, and is not intended to be limiting. As used in this specification and the appended claims, "vehicle," "vehicular" and like terms refer to any motorized mode of conveyance capable of traveling across land, rail, water or air. The term "processing" as applied to the processing of vehicular fluid, refers to the capture, storage, treatment and delivery or routing of fluid to one or more locations of a vehicle. The terms "treat," "treatment" and like terms refer to affecting the captured fluid or otherwise acting upon the captured fluid within the system to produce one or more desired fluid products. The term "air conditioner" may be used interchangeably with "A/C" or "AC." Herein, the term "condensate" refers to condensate fluid derived from a condensate forming member of a vehicle. A "trigger temperature" of the system is an ambient temperature relative to the freezing point that is operationally configured to dictate the addition of one or more fluid based chemicals to the captured condensate of the system. The phrase "warm weather" may include an ambient system temperature range including a lowermost temperature a preset number of degrees above an uppermost ambient trigger temperature of the system. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

In one aspect, the application provides a system and method of capturing condensed fluid from a vehicle surface, treating the fluid, and routing the treated fluid to a fluid reservoir of the vehicle. In another aspect, the application provides a system for processing captured condensed vehicular fluid to produce a fluid having a composition different from the condensed fluid initially captured from the vehicle for processing. In another aspect, the application provides a system for processing condensed vehicular fluid to provide a replenishing fluid for a depleted vehicle reservoir, the composition of the replenishing fluid being substantially similar to the fluid initially housed within the depleted vehicle reservoir. In another aspect, the application provides a system for processing captured vehicular fluid, the system including one or more safety features operationally configured to protect against non-requested, undesired or unnecessary operation of the system. As desired, one or more chemicals including, but not necessarily limited to antifreeze chemicals may be added to the captured condensed vehicular fluid to provide for use of the fluid at freezing and subfreezing temperatures.

In another aspect, the system of this application includes an electrical system defined by control circuitry, fluid volume sensors, ambient temperature sensors, the control circuitry being in communication with (1) a system pump operationally configured for the transfer or conveyance of captured vehicular fluid, (2) fluid volume sensor systems of the reservoirs of the system and (3) reservoir valves for dictating fluid flow in and out of the reservoirs of the system. In another aspect, the application provides a system having a pump, temperature sensor and fluid level sensor systems in electrical communication, the fluid level sensor systems being operationally configured to determine the fluid levels of various reservoirs of the system and the temperature sensor being operationally configured to determine the ambient temperature of the system. The system also is operationally configured to guard against non-requested, undesired or unnecessary operation of the pump during vehicle use.

In another aspect, the application provides a system having an accurate and reliable safety cutoff feature. In another aspect, the application provides a system having a temperature switch for shutting off the system once a certain ambient temperature of the system has been reached. In another aspect, the present system includes one or more heating elements operationally configured to heat captured fluid. In another aspect, the present system includes a safety feature operationally configured to prevent the system from providing both a reservoir full signal and a reservoir empty signal simultaneously. In another aspect, the application provides a manually actuated system for processing captured vehicular fluid.

In another aspect, the application provides a system including a time delay effective to guard against non-requested, undesired or unnecessary operation of the system. In another aspect, the application provides a system operationally configured to add one or more chemical based fluids to captured A/C condensate to provide an antifreeze fluid mixture according to one or more ambient temperature parameters.

In another aspect, the application provides a system including the option of a temperature switch to control the system usage during cold weather conditions, wherein once the ambient temperature of the system has reached about 0° C. (about 32.0° F.), the temperature switch is operationally configured to deactivate the system.

In another aspect, the application provides a system having a pump time delay controlled by a time delay chip of the system's control circuitry as known to persons of ordinary skill in electronics.

In another aspect, the application provides a system having a filter or similar item that may be placed at a point between a fluid reservoir storing captured fluid and a pump whereby the filter or similar item is in fluid communication with both the fluid reservoir and the pump for fluid treatment prior to being delivered downstream in the system. In another aspect, the application provides a system having an in-line check valve incorporated in a fluid conduit downstream of a fluid pump of the system.

In another aspect, the application provides a system having control circuitry in electrical communication with (1) fluid volume sensor systems of fluid reservoirs and with (2) a fluid circulation member that is operationally configured to convey fluid between upstream fluid reservoirs and downstream reservoirs of the system. The control circuitry includes a timer relay operationally configured to determine the operation time of the fluid circulation member once the fluid circulation member is activated. The timer relay is also operationally configured to delay activation of the fluid circulation member to safeguard the system against non-requested operation of the fluid circulation members during vehicle use. Suitably, operation of the fluid circulation member may be determined according to the fluid volume of the system fluid reservoirs and settings of the timer relay in relation to one or more post-treatment fluid reservoirs.

To better understand the novelty of the system and method of use thereof, reference is hereafter made to the accompanying drawings, in which like numerals represent like components throughout the several views. The following description is merely exemplary in nature and is in no way intended to limit the invention, its application or uses.

Figure 2:
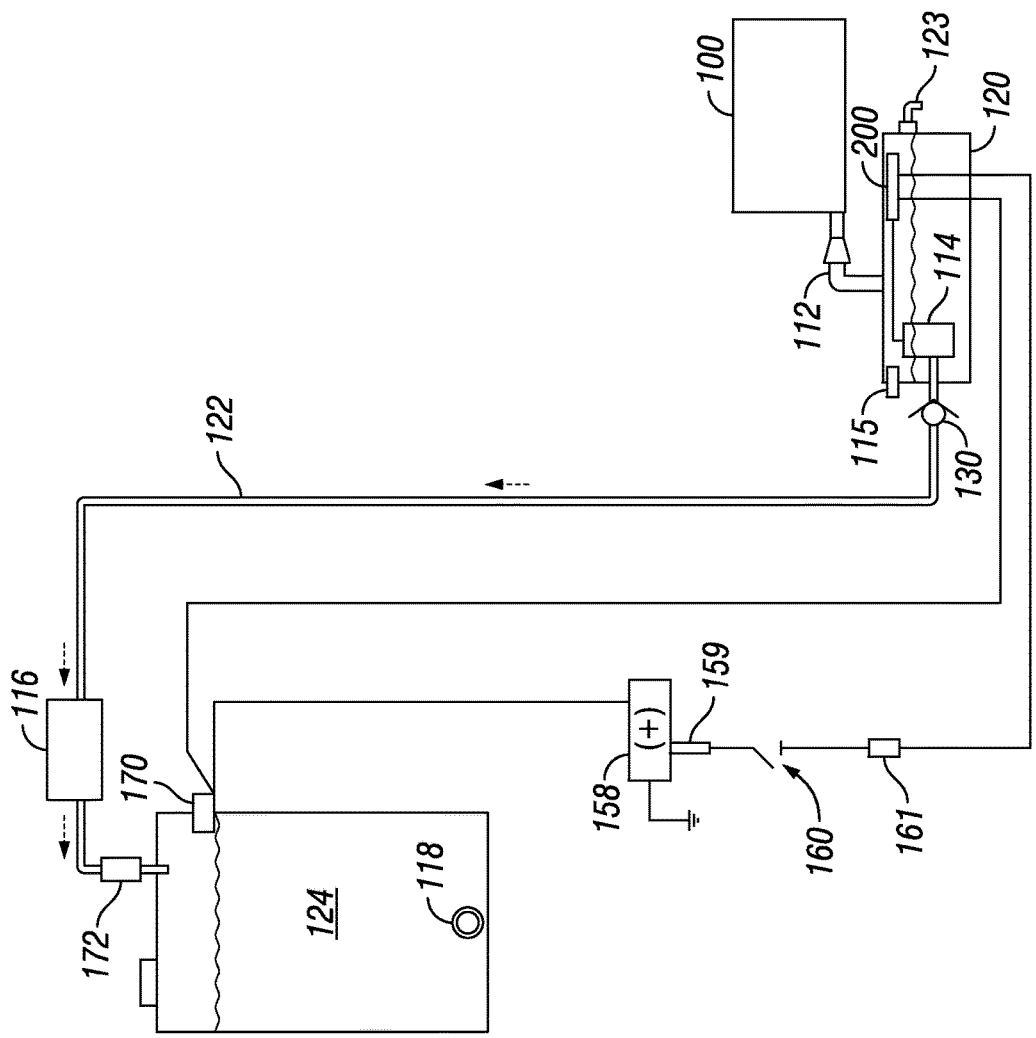
FIG. 2 shows another exemplary system for processing captured vehicular fluid.
Figure 3:
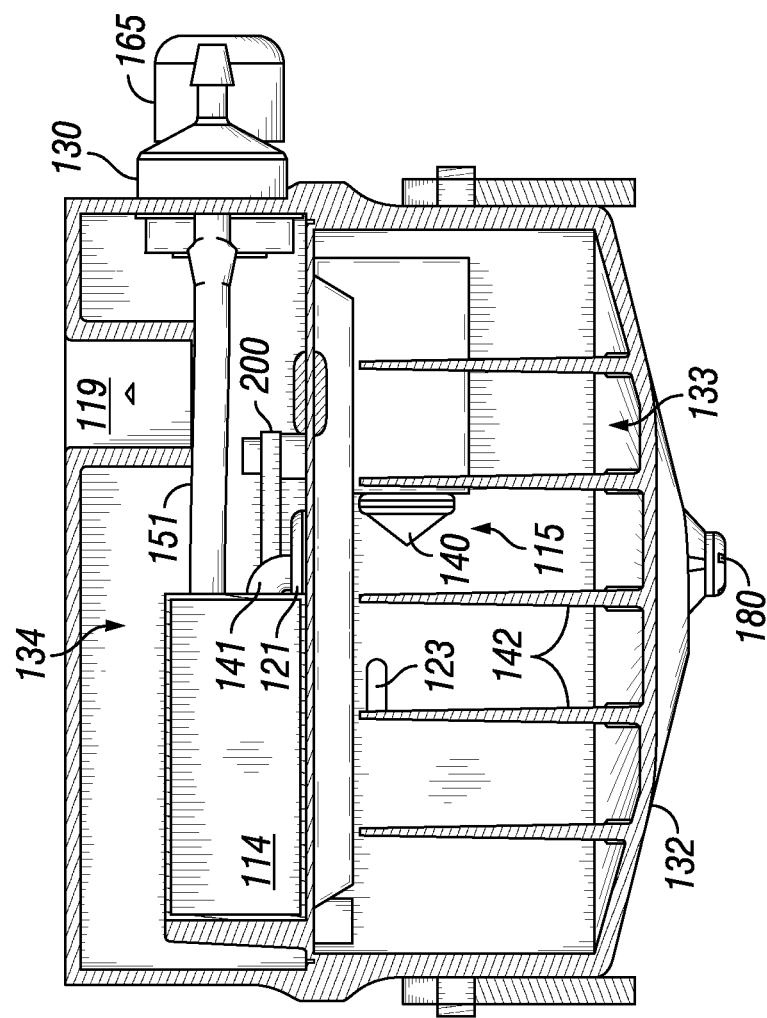
FIG. 3 shows an exemplary control module of the systems of FIG. 1 and FIG. 2.

In one aspect, the present invention includes a system for filling vehicular fluid reservoirs with fluid captured from a surface or basin of a vehicle, e.g., captured fluid that is used to refill a windshield wiper fluid reservoir as described in U.S. Pat. No. 8,865,002 B2 entitled "Processing Captured Vehicle Fluid" issued on Oct. 21, 2014, and herein incorporated by reference in its entirety. Suitably, the present system may include at least a captured fluid reservoir with or without baffle arrays, fluid inlets and overflow outlets, post-treatment fluid reservoirs, fluid circulation devices, treatment members, fluid volume sensor systems, control circuitry including a timer relay. With reference to FIGS. 1-3, the present invention suitably includes at least (1) a fluid reservoir 120, (2) an inlet member 112 in fluid communication with the fluid reservoir 120, the inlet member 112 being operationally configured to capture fluid from a vehicle surface 100, (3) a fluid circulation member 114 in fluid communication with the fluid reservoir 120, (4) a fluid volume sensor system 115 attached to the fluid reservoir in electrical communication with the fluid circulation member 114, (5) a treatment member 116 in fluid communication with the fluid circulation member 114 via conduit 122, (6) a power source 117 in electrical communication with the fluid circulation member 114 and fluid volume sensor system 115 and (7) an outlet 118 in fluid communication with the treatment member 116 via conduit 122. In another embodiment, a separate power source may be employed for powering the system. In operation, fluid is suitably conveyed via the fluid circulation member 114 from the fluid reservoir 120 through the treatment member 116 to the outlet 118 via conduit 122. The inlet member 112 is suitably operationally configured to receive collected fluid from a surface or basin of a vehicle or to receive condensate from a condensate producing system of a vehicle. For example, as condensate accumulates on the surface of a vehicle's air conditioning evaporator coil the inlet member 112 is operationally configured to receive condensate from the A/C drip pan, where after the fluid may be stored in the fluid reservoir 120.

The fluid reservoir 120 may be sealed to a vehicle surface 100 such as an A/C assembly in a manner effective to capture condensate, or the fluid reservoir 120 may be provided as an all-in-one condensate producing/condensate capture reservoir. In another embodiment, the inlet member 112 and fluid reservoir 120 may be installed and fluidly connected to a pre-existing vehicle surface 100, e.g., a system 110 operationally configured for after-market use. Suitably, the inlet member 112 may comprise a collection pan in fluid communication with a fluid reservoir 120 wherein the collection pan set apart from a vehicle surface 100 is operationally configured to capture condensate as the condensate drops from the vehicle surface 100, the captured fluid thereafter flowing via gravity into the fluid reservoir 120. Treated fluid suitably passes through the outlet 118 for downstream use as desired.

With reference to FIG. 2, the system may further comprise one or more post-treatment reservoirs 124 in fluid communication with both the treatment member 116 and the outlet 118. The system 110 may also include a valve 130 located downstream from the fluid circulation member 114 operationally configured to regulate back flow of fluid in the conduit 122 toward the fluid circulation member 114. In this embodiment, the valve 130 is suitably positioned along the conduit 122 at a point between the fluid circulation means 114 and the treatment member 116. In another embodiment, both the valve 130 and the fluid circulation means 114 may be housed within the fluid reservoir 120, the valve 130 being suitably positioned along the conduit 122 between the fluid reservoir 120 and the treatment member 116. Turning to FIG. 3, a control module of the systems described in FIGS. 1 and 2 may include a fluid reservoir 120 with a fluid storing first compartment 133 oriented below a second dry compartment 134. As shown, the second compartment 134 is operationally configured to house (1) a reservoir inlet 119, the reservoir inlet 119 being in fluid communication with inlet member 112, (2) a fluid circulation member 114, (3) a check valve 130, (4) conduits fluidly connecting the inlet 119 to the first compartment 33, the first compartment 133 to the fluid circulation member 114, and the fluid circulation member 114 to the check valve 130, and (4) control circuitry 200.

In addition to the above features, the present system may also include additional reservoirs, components, conduits, sensors, probes, valves, vents, circuitry and fluid additives for treating captured fluid to provide an antifreeze fluid usable in one or more vehicular post-treatment fluid reservoirs at freezing or subfreezing temperatures. In other words, the present invention is also operationally configured to use captured fluid to provide one or more fluid mixtures operable at freezing and/or subfreezing temperatures.

Figure 4:
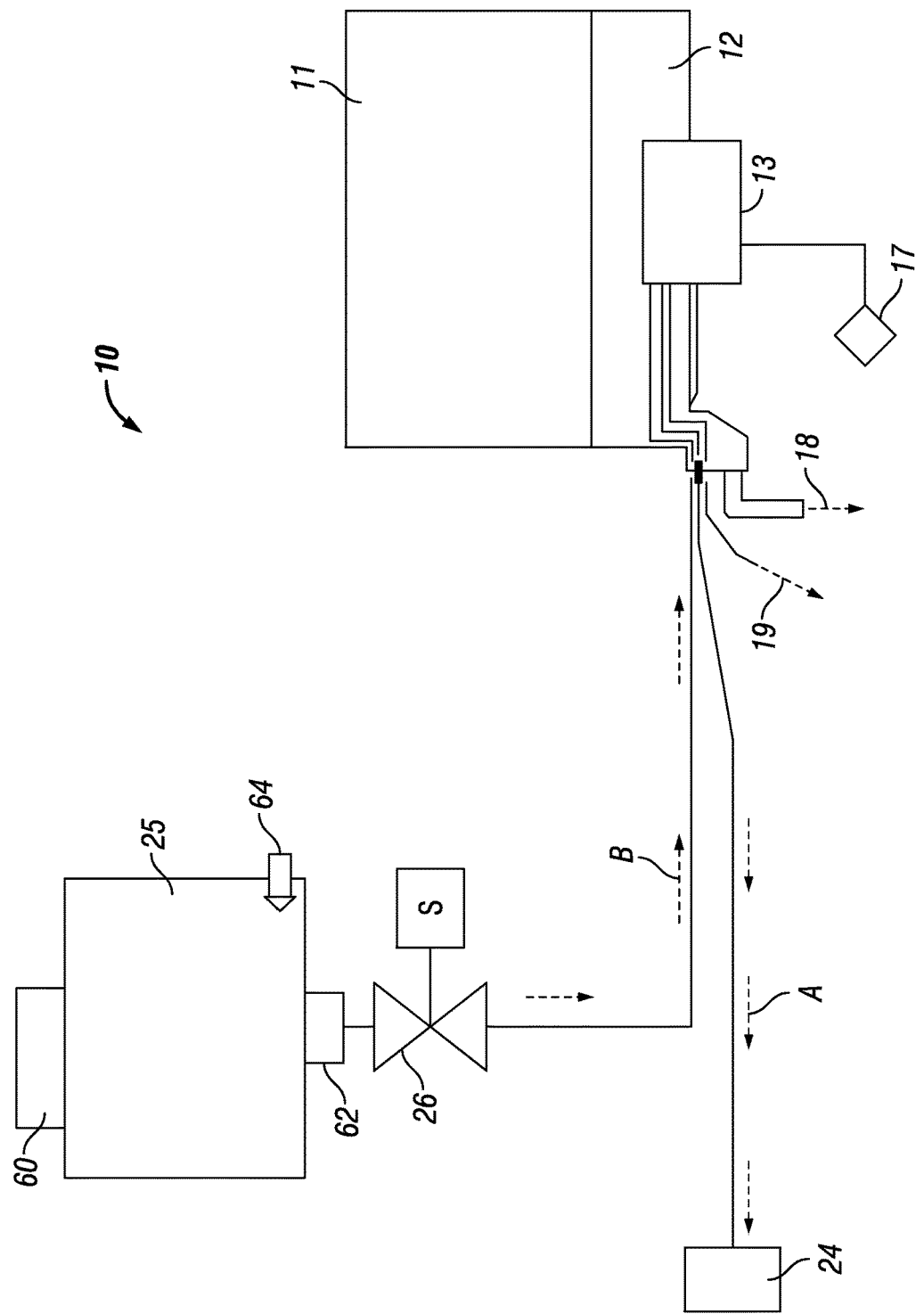
FIG. 4 shows another exemplary system for processing condensed vehicular fluid.

With attention to FIG. 4, an exemplary system 10 of this application may include at least (1) a vehicular A/C assembly including an (a) A/C evaporator 11, (b) a blower motor and fan (not shown), (c) an A/C drain plug or drip pan and fluid outlet 18 in fluid communication with the A/C evaporator 11—as understood by persons of ordinary skill in the art of vehicular air conditions, (2) a fluid reservoir assembly (hereafter "control module 13") for fluid storage, controlling fluid circulation of the system and the fluid chemical composition of fluid mixtures stored therein, (3) a power source 17, either a vehicular power source, e.g., lead-acid battery, or a separate power source having a positive terminal and a ground, in electrical communication with the electrical system of the system 10, e.g., the control circuitry 15 of the control module 13, (4) a first post-treatment fluid reservoir assembly 24 in fluid communication (Directional Arrow A) and in circuit communication with the control module 13, (5) a chemical reservoir assembly 25 in fluid communication (Directional Arrow B) and in circuit communication with the control module 13, (6) a treatment member (not shown) in fluid communication with the control module 13 and post-treatment reservoir 24 and (7) a temperature sensor (not shown) operationally configured to measure the ambient temperature of the system 10. As discussed herein, the chemical reservoir assembly 25 suitably houses one or more chemical based fluids operationally configured to be added to the control module 13 via activation of the valve member 26 to provide a fluid chemical additive to the fluid captured into the control module 13 via the vehicle A/C assembly. The resulting chemical fluid mixture may be conveyed downstream to one or more post-treatment fluid reservoirs. In one embodiment, the chemical reservoir assembly 25 may deliver one or more chemical based fluids to the control module 13 via gravity. In another embodiment, the chemical reservoir assembly 25 may include a pump 62 at an outlet of the fluid storing reservoir of the assembly 25 for conveying one or more fluid chemicals to the control module 13.

Figure 5:
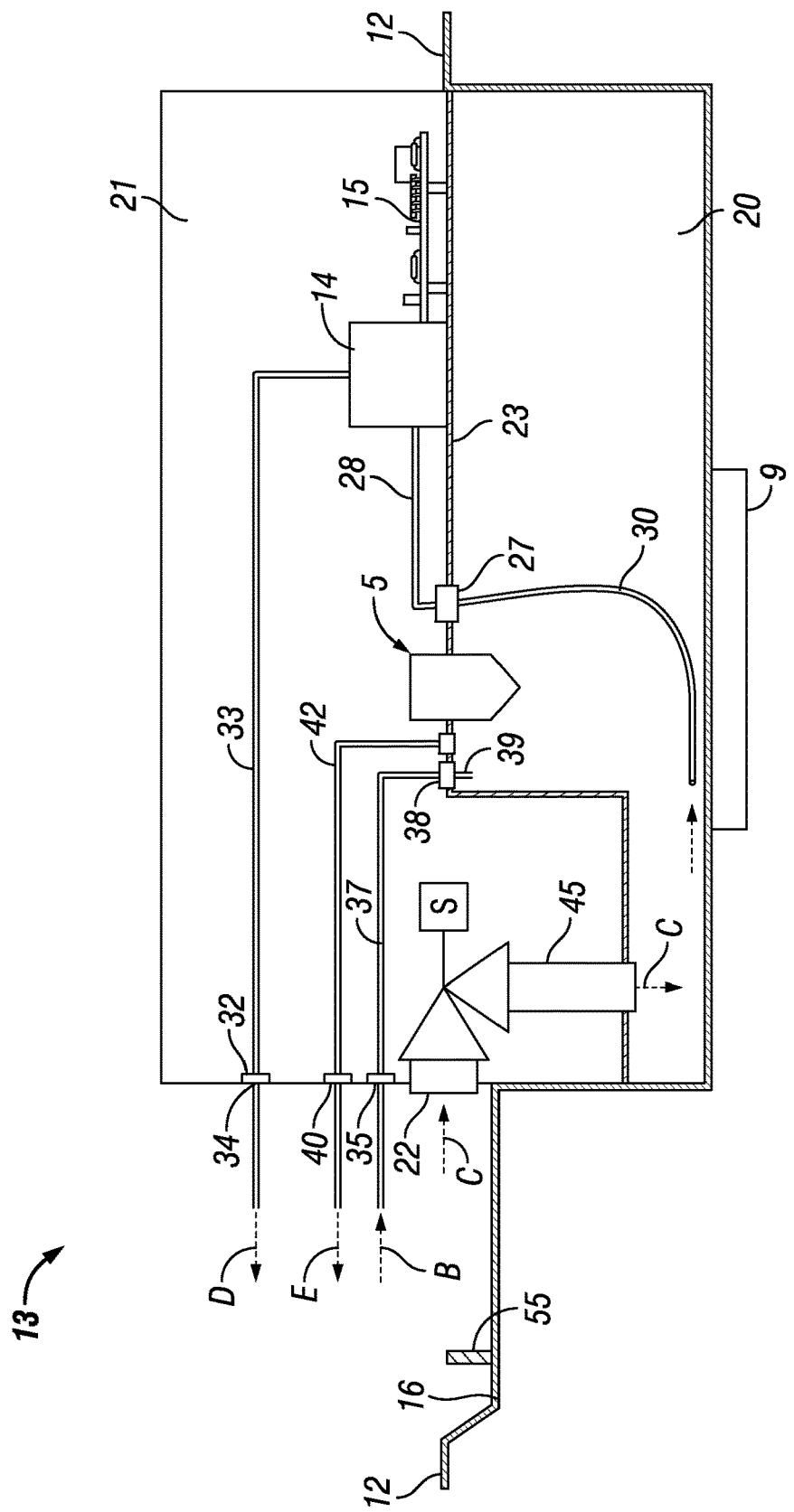
FIG. 5 is a simplified illustration of an embodiment of a control module.
Figure 6:
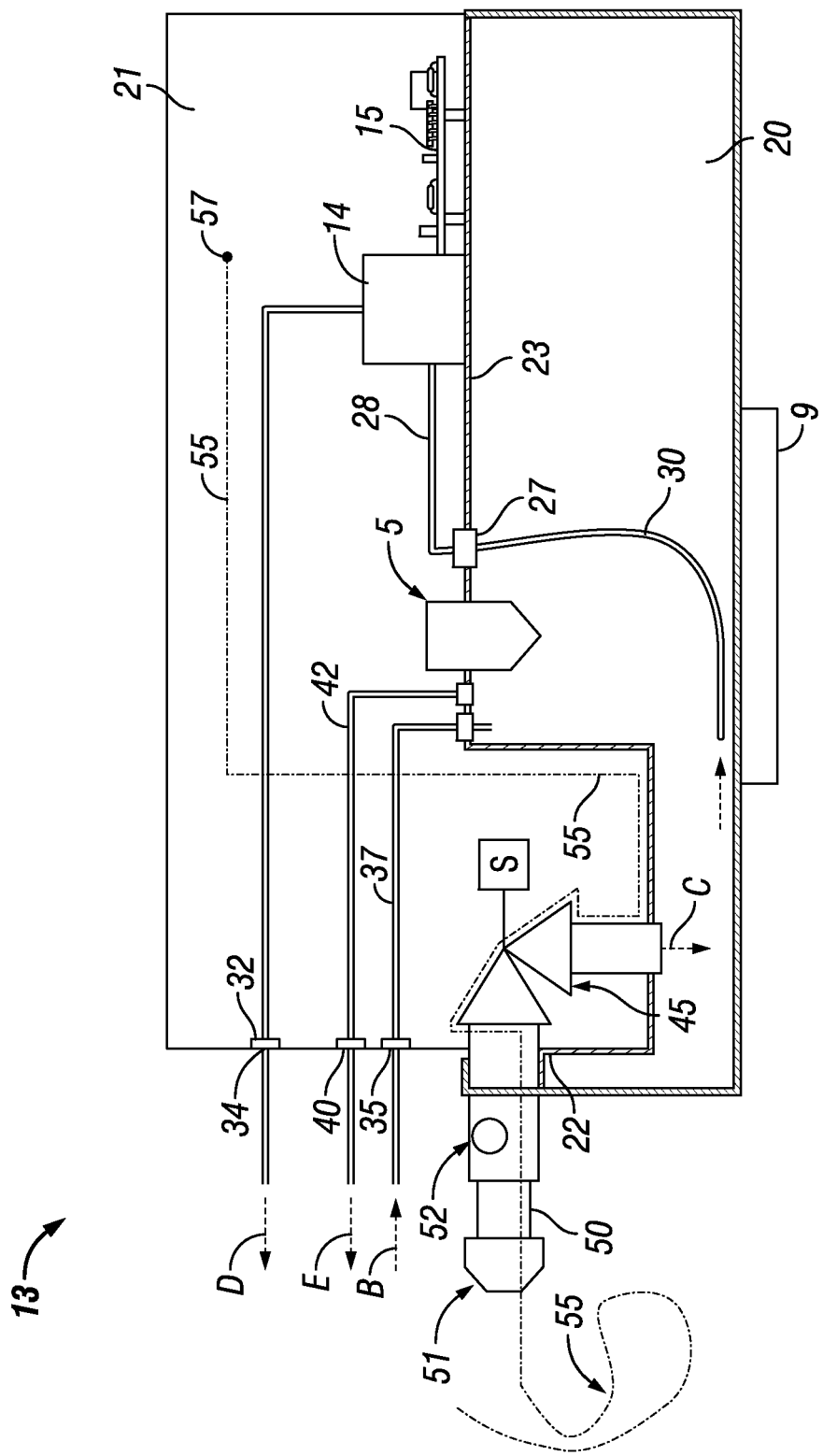
FIG. 6 is a simplified illustration of another embodiment of a control module.

The present system 10 may be provided either as (1) an original equipment (hereafter "OE") system of a vehicle's A/C assembly or (2) as an aftermarket type add-on system to a pre-existing A/C assembly of a vehicle. For example, an OE control module 13 may be provided as a one piece mold construction incorporated as part of a vehicle's drip pan 12 assembly as shown in the simplified illustration of FIG. 5. In another embodiment, a control module 13 may be provided as a separate after-market add-on type component for use with a pre-existing A/C assembly as shown in the simplified illustration of FIG. 6. For each type of system, one or more of the component parts may vary in size and shape and proximity to one another according to the design features of a particular vehicle. In addition, one or more separate component parts may be provided as releasable members for replacement as desired or otherwise required. Also, two or more component parts may be provided as a one piece mold construction. In the embodiment of FIG. 5, the OE control module may be attached and sealed to a condensate drip pan as desired, e.g., via ultrasonic welding. In the embodiment of FIG. 6, the control module 13 may have one or more surfaces, mounting tabs, and the like for receiving fasteners there through effective for releasably attaching the control module 13 to a vehicle surface. Suitable fasteners include one or more threaded screws or other common removable fasteners. In addition, one or more seals such as gaskets, O-rings, and the like, may be included effective for sealing the outer surface of the control module 13 to a vehicular surface as desired.

In an OE embodiment of the system 10, the temperature sensor may include the factory provided ambient air temperature sensor commonplace on modern vehicles such as automobiles. In this embodiment, the control circuitry 15 is electrically communicated with the temperature sensor of the vehicle for suitable system operation. In an add-on embodiment, an ambient air temperature sensor is suitably provided as part of the system 10 to be installed onto the vehicle. In this embodiment, the ambient air temperature sensor is electrically communicated with the control circuitry 15 inside the control module 13, e.g., the temperature sensor is provided in the form of a chip on a printed circuit board ("PCB") housed in the second compartment 21 for measuring the ambient temperature during system 10 operation.

With attention to the simplified embodiment of FIG. 5, an OE control module 13 is provided. As shown, the control module 13 is set in fluid communication with an A/C condensate drip pan 12 via at least a first inlet 22 located at the lower part of the drip pan 12 (Directional Arrow C). As such, condensate collected in the gutter 16 of the drip pan 12 may empty out (1) through the outlet 18 into the ambient environment of the vehicle or (2) flow into the control module 13 via inlet 22.

As shown, the control module 13 is suitably separated into at least two compartments, spatially related side-by-side or above/below as depicted in FIG. 5. The first compartment 20 is operationally configured to store fluid received from the A/C drip pan 12 via fluid inlet 22, which is suitably disposed along the housing of the second compartment 21. The second compartment 21 is operationally configured to house at least one fluid circulation member 14 for conveying fluid out from the first compartment 20 and control circuitry 15 for operation of the electronics of the system 10. In another embodiment, the control circuitry 15 may be housed separate from the control module 13. Because the control module 13 may be built to scale, the total volume of the control module 13 may vary as desired and the total volume of one or more of the interior compartments may vary also. For common automobile use, the volume of the first compartment 20 may range from about 0.06 liters to about 0.12 liters (from about 2.0 ounces to about 4.0 ounces). In one particular embodiment, the first compartment 20 may include a volume of about 0.12 ml (4.0 ounces).

Suitably, the system 10 includes a fluid volume sensor system including one or more fluid volume sensors 5 housed in the first compartment 20, the fluid volume sensor 5 being in electrical communication with the fluid circulation member 14 whereby the fluid volume sensor system is operable to activate the fluid circulation member 14 once the fluid volume within the first compartment 20 rises to a predetermined level for pumping fluid out from the first compartment 20 if/when other system 10 parameters are met as discussed herein. Without limiting the invention, suitable fluid circulation members 14 may include, but are not necessarily limited to pumps, siphoning devices or other pressure sources, blowers, propellers, push components to deliver fluid, and combinations thereof. For purposes of simplicity, the fluid circulation member 14 described hereafter may include a centrifugal pump ("pump 14") operationally configured to convey fluid from the first compartment 20 to one or more post-treatment reservoirs, e.g., post-treatment reservoir 24 in FIG. 4. A suitable electrical connection between the sensors of the system 10 and the pump 14 includes those known to persons of ordinary skill in electrical wiring, such as but not necessarily limited to electrical plugs, quick connects, and hardwire techniques such as wire splices, soldered connections, and crimp splices. Suitably, the control module 13 includes a wiring access port for receiving the system's 10 electric connections therein. Suitable fluid level sensors 5 include, but are not necessarily limited to float-type switches, hydroelectric switches, pressure sensors/probes, and fluid level sensors/probes. One suitable sensor 5 includes a fluid level sensor in the form of an optical liquid level sensor with an infra-red emitter and phototransistor. As understood by persons of ordinary skill in the art of optical liquid level sensors, the fluid activation level of the pump 14 is suitably set at a fluid level within the first compartment 20 wherein the tip of the sensor 5 is immersed in fluid. Deactivation or inactivity of the pump 14 is suitably set when the tip of the sensor 5 is exposed to air. Suitable optical liquid level sensors may be acquired from SST Sensing, Ltd, United Kingdom; and Honeywell International Inc.

As FIG. 5 illustrates, the first and second compartments 20, 21 are separated by a solid barrier 23 with a first aperture formed there through for the transfer of fluid from the first compartment 20 to the second compartment 21. In one embodiment, one or more grommets, barb fittings or other annular surface sealing members 27 may be employed at the aperture to form a fluid seal between the first and second compartments 20, 21. In such embodiment, a first conduit 28 is suitably attached to the pump 14 at a first end and to the sealing member 27 at its second end to fluidly communicate the pump 14 with the first compartment 20. A second conduit 30 may be attached to the sealing member 27 within the first compartment 20 in a manner effective for fluid to be pumped through the second conduit 30 to the pump 14 and thereafter downstream in the system 10. As shown, the system 10 may include a third conduit 33 in fluid communication with the pump 14 for conveying fluid out of the control module 13 (Directional Arrow D) through an aperture forming a fluid outlet 34 disposed along the housing of the second compartment 21. Conduits 28, 30 and 33 may collectively be referred to herein as "pumping conduits." Similar as described above, the third conduit 33 may be fluidly communicated to a sealing member 32 at the fluid outlet 34. In the alternative, the third conduit 33 may extend through the fluid outlet 34 for fluid communication downstream with another conduit, via a sealable connector, a treatment member, or post-treatment fluid reservoir. In another embodiment, the pump 14 may be directly sealably communicated with fluid outlet 34 for delivery of fluid out of the control module 13.

In another embodiment, a single pumping conduit may extend from the pump 14 into the first compartment 20 whereby fluid in the first compartment 20 may be drawn into the conduit through a second open end via operation of the pump 14 for conveyance to one or more post-treatment fluid reservoirs. In this embodiment, the outer surface of the conduit 30 is suitably sealed to the perimeter of the aperture of the barrier 23 in a manner effective to form a fluid seal there between using an epoxy or other suitable adhesive. Suitable conduit materials will become readily apparent to those skilled in the art, given the benefit of this disclosure. For instance, the conduit may comprise any tubing effective for the transfer of fluid through the system 10. In addition, the conduit may have any shape that is capable of transferring fluid throughout the system 10. In one embodiment, one or more of the various conduits may be pre-formed for a particular application. In another embodiment, one or more of the various conduits may comprise flexible tubing. Non-limiting examples of suitable conduit materials include, but are not necessarily limited to metal alloys, glass, polymeric materials, and combinations thereof. In one particularly advantageous embodiment, the conduit may be a flexible plastic hose or a silicone hose. Suitable fittings for securing the conduit employed may include, but are not necessarily limited to zip ties and barbed fittings.

During system 10 operation, the first aperture provides the fluid exit for fluid stored in the first compartment 20. For cleaning and maintenance purposes, another opening 9 to the interior of the first compartment 20 may be provided. Without limiting the opening 9 to a specific embodiment, a suitable opening 9 is may include an aperture through the outer housing of the first compartment 20 fluid sealable via a twist cap, snap-on cap, or other removable seal member or cover. Suitably, the opening 9 is large enough to allow a human finger, tool, brush, cloth material, and the like to pass there through into the interior of the first compartment 20.

Still referring to FIG. 5, the control module 13 also includes a chemical inlet 35 in fluid communication with the chemical reservoir 25 for receiving one or more chemical based fluids from the chemical reservoir 25 into the first compartment 20. In one embodiment, the chemical inlet 35 may be disposed along the housing at the first compartment 20 for direct delivery of chemical based fluids from the chemical reservoir 25 into the first compartment 20. As shown in FIG. 5, the chemical inlet 35 may also be disposed along the housing at the second compartment 21 where a fourth chemical conduit 37 is operationally configured to deliver fluid received from the chemical reservoir 25 to the first compartment 20. In one embodiment, the fourth conduit 37 may run from a point within the first compartment 20 to a point of connection with the chemical reservoir 25. In one embodiment, a first end of the fourth conduit 37 may be fluidly communicated to the chemical inlet 35, e.g., connected to a sealing member, and extend through a second aperture of the solid barrier 23 into the first compartment 20 for delivery of chemical based fluids into the first compartment. As shown, the fourth conduit 37 may also be fluidly communicated with a sealing member 38 at the second aperture and include a fifth chemical conduit 39 in fluid communication with the sealing member 38 located in the first compartment 20. Suitably, the seals formed at the second aperture for the chemical conduits 37, 39 are similar as described above in relation to seals formed at the first aperture for the pumping conduits.

The control module 13 may also include a gas outlet 40 for ventilation of gaseous material from the first compartment 20 to the ambient environment (Directional Arrow E). Depending on the type of chemical based fluid(s) delivered to the first compartment 20 from the chemical reservoir 25, it may be necessary to vent the first compartment 20 when subject to vapor pressure. One suitable gas outlet 40 includes a two-way vent allowing passage of ambient air to be drawn into the first compartment 40. As such, the gas outlet 40 may be operationally configured to release gaseous material, e.g., vapors, fumes, out from the system 10 and/or allow for the entry of ambient air into the system 10 to prevent air lock of the pump 14 that may otherwise be caused by a vacuum formed when the fluid in the first compartment 20 empties as the fluid is pumped downstream in the system 10. Ambient air pulled into the first compartment 20 via the gas outlet 40 prevents vacuum formation. Suitably, a gas outlet 40 may be disposed along the second compartment 21 whereby the gas outlet 40 is fluidly communicated with the first compartment 20 via a sixth conduit 42. In such embodiment, the solid barrier 23 suitably includes a third aperture there through that is fluidly sealed via one or more sealing members or the sixth conduit 42 similarly as described above in relation to sealing of the pumping conduits. As understood by the skilled artisan, the third aperture for communicating the conduit 42 with the first compartment 20 is suitably disposed near the uppermost part of the first compartment 20 to prevent any liquids to pass through the conduit 42. Suitably, it is desired that the first compartment 20 be characterized by an ambient air pressure.

The embodiment of the control module 13 in FIG. 5 suitably includes a valve member 45 at the fluid inlet 22 that is (1) electronically communicated with the control circuitry 15 and (2) fluidly communicated with the drip pan 12 on its upstream end and with the interior of the first compartment 20 on its downstream end. One particular valve member 45 may include a solenoid valve—shown here as a right angle two port solenoid valve—operationally configured to control fluid flow from the drip pan 12 into the first compartment 20 (see Directional Arrow C). As understood by the skilled artisan, a two port solenoid valve has one inlet port and one outlet port to both permit and shut off fluid flow there through where the two basic types of operations for a solenoid valve are "Normally Closed" and "Normally Open." The valve member 45 may also be referred to herein as an isolation valve and is suitably closed when the vehicular AC blower motor and fan is shut off. For example, when closed, the valve member 45 is operationally configured to keep fluid from escaping out of the first compartment 20 through the fluid inlet 22 back to the drip pan 12, i.e., prevents fluid backflow. The valve member 45 is also operationally configured to keep gaseous material from escaping out of the first compartment 20 through the fluid inlet 22 into a vehicle passenger compartment, e.g., to prevent gaseous odors from entering a vehicle passenger compartment. The valve member 45 is further operationally configured to prevent captured fluid in the drip pan 12 from entering the first compartment 20 when the ambient temperature is at freezing or below and there is no fluid or an insufficient amount of antifreeze fluid in the chemical reservoir 25. It is also herein contemplated that a three port solenoid valve may be used when two outlet ports are desired.

The system 10 may also include one or more electrical heating elements 55 housed within the drip pan 12 and/or gutter 16 and/or along the valve member 45 for maintaining the fluid housed therein in a fluid state for desired fluid flow through the valve member 45 into the first compartment 20 when the system 10 is subject to freezing or subfreezing ambient weather. In other words, the one or more heating elements 55 are operationally configured to maintain the temperature of the captured fluid above freezing temperatures during cold weather. In addition, one or more heating elements 55 may be located within the first compartment 20 as desired or otherwise required.

Suitably, the one or more heating elements 55 are provided in electrical communication with the control circuitry 15, which is operationally configured to regulate the flow of electrical power to the one or more heating elements 55 to control the activation, deactivation and emission of heat of the one or more heating elements 55. As understood by persons of ordinary skill in the art, a common heating element converts electricity it receives into heat, the amount of heat emitted by a heating element being based on the amount of power supplied to the heating element. Suitably, the specific size and/or spatial relationship of the one or more heating elements used may be selected according to the fluid volume of the drip pan 12 and/or the drip pan 12 dimensions and/or inner configuration and/or the anticipated ambient temperature minimum conditions and length of time for one or more temperatures and/or temperature ranges. Suitable heating elements 55 include, but are not necessarily limited to metal heating elements, ceramic heating elements, composite heating elements, and combinations thereof. One suitable heating element 55 includes a low amperage heating element such as a low amperage metal heating coil. A low amperage heating element suitably reduces or eliminates risk of fire hazard, minimizes stress on the electrical system of the vehicle and/or the system 10 itself, reduces or eliminates heat stress to the heating element itself, reduces or eliminates heat stress on any plastic parts of the system 10 exposed to the emitted heat, provides stored fluid with just enough heat to maintain the fluid at just above freezing and minimize evaporation of stored fluids.

Turning to the add-on type system 10 shown in FIG. 6, a suitable control module 13 may be attached to the A/C assembly as desired, e.g., via one or more brackets, fasteners, tie-wraps, bungee ties, adhesives, and combinations thereof. For automobile applications, one cost effective mode of attaching a control module 13 is via one or more tie-wraps. Although the control module 13 may be secured to an A/C assembly in a permanent manner, a suitable control module 13 as shown in FIG. 6 may be provided as a releasable unit. In this embodiment, a condensate collection conduit 50 is provided at the fluid inlet 22, the conduit 50 being operationally configured to receive condensate from a vehicle's A/C condensate drain tube and direct the condensate through the inlet 22 to the first compartment 20 of the control module 13. Unlike the embodiment of FIG. 5, in the embodiment of FIG. 6 the control module 13 includes a valve member 45 at the fluid inlet 22 that is (1) electronically communicated with the control circuitry 15 and (2) fluidly communicated with the conduit 50 on its upstream end and fluidly communicated with the interior of the first compartment 20 on its downstream end. Suitably, the conduit 50 is secured at the fluid inlet 22 in a manner effective to provide a fluid seal at the inlet 22 so that condensate flowing through the conduit 50 does not escape out of the system 10 via the inlet 22. In one embodiment, the conduit 50 may be mated with the inlet 22 in a threaded screw on manner. In another embodiment, the conduit 50 may be mated with the inlet 22 in a snap-on fit. In still another embodiment, one or more adhesives and/or sealants may be used to seal the outer surface of the conduit 50 to the perimeter of the inlet 22 providing a fluid seal there between.

The valve member 45 employed at the fluid inlet 22 may be similar as described above in reference to the embodiment of FIG. 5. As shown, the conduit 50 may include an enlarged head member or barb member 51 at its distal end. As understood by persons of ordinary skill in barbed fluid conduits, an enlarged head member 51 is operationally configured to mate with the A/C condensate drain tube whereby the head member 51 is operationally configured to form a seal along the perimeter of the drain tube allowing for condensate to flow through the conduit 50 toward the valve member 45. Suitably, the conduit 50 also includes an overflow outlet 52 operationally configured for the release of condensate out from the system 10 when the valve member 45 is set to a closed position, e.g., the overflow outlet 52 may allow condensate to be dumped out onto the ground underneath the vehicle.

In this embodiment, one or more elongated heating elements 55 in the form of elongated strip members or the like may be provided for heating (1) condensate in the A/C condensate drain tube, (2) the condensate collection conduit 50 and (3) the valve member 45 in a manner effective to maintain the temperature of the captured condensate above freezing temperatures when exposed to ambient freezing temperatures. In this embodiment, the one or more heating elements 55 suitably run from a distal end within an A/C condensate drain tube through the conduit 50, around the valve member 45 to a point of electronical communication in the second compartment 21. As shown in FIG. 6, the proximal end of the heating element 55 is suitably electrically connected to a termination and distribution point such as a busbar 57 in the second compartment 21 to define an electrical circuit for the heating element 55. A suitable busbar 57 is part of the control circuitry 15 for regulating the flow of electrical power to the one or more heating elements 55 to control the activation, deactivation and emission of heat of the one or more heating elements 55. In one embodiment, the heating element 55 may include a flexible resistive strip heater. In another embodiment, the heating element 55 may include a silicone rubber heater strip member. In still another embodiment, the condensate collection conduit 50 may be provided as a heated hose material operationally configured to heat the fluid passing there through.

Without limiting the control module 13 and condensate collection conduit 50 to any particular materials of construction, a suitable control module 13 and/or condensate collection conduit 50 are constructed from materials including, but not necessarily limited to those materials resistant to chipping, cracking, excessive bending and reshaping as a result of ozone, weathering, heat, moisture, other outside mechanical and chemical influences, physical impacts, and combinations thereof. In particular, the control module 13 and condensate collection conduit 50 may be constructed from materials including but not necessarily limited to metals, polymeric materials, fiberglass, plexiglass, filled composite materials, and combinations thereof. Likewise, the control module 13 and condensate collection conduit 50 may comprise any color or combination of colors, and they may also be transparent and translucent, or partially so, as desired. In one particular embodiment, the control module 13 may be constructed from plastic. In another embodiment, the control module 13 may be constructed from Acrylonitrile-Butadiene-Styrene ("ABS") thermoplastic. In one particular embodiment, the condensate collection conduit 50 may be constructed from plastic.

The control module 13 may be formed using known techniques including, but not necessarily limited to blow molding, injection molding, assembly of separate preformed individual components, and a combination thereof. The mode of manufacturing of the control module 13 may be determined by one or more factors including, but not necessarily limited to (1) the type of vehicle, or in the case of an automobile the make and model thereof, (2) the intended use of the vehicle, (3) the anticipated retail cost of the system 10, (4) performance requirements of the system 10, and combinations thereof. In addition, the type of construction materials used to manufacture the control module 13 may depend on the type of (1) pump 14 employed and/or (2) the types of fluid chemicals to be used in the system 10 and/or (3) any governmental requirements.

Turning again to FIG. 4, one or more chemical reservoirs 25 are provided for storage of one or more chemical based fluids to be added to the first compartment 20 as desired. Without limiting the volume capacity, a suitable chemical reservoir 25 holds enough fluid effective to provide a desired fluid mixture in the first compartment 20. For example, in one embodiment one or more chemical reservoirs 25 may store one or more chemical based fluids to provide antifreeze qualities and/or lubricating qualities and/or cleaning qualities and/or deicing qualities and/or antistatic qualities and/or water repellant (rain repellant and antifogging) qualities to the captured fluid housed in the first compartment 20. The intended use of the treated fluid housed in the first compartment 20 may dictate the chemical based fluid(s) housed in one or more chemical reservoirs 25. Suitable antifreeze and/or deicing chemical based fluids include, but are not necessarily limited to alcohols, glycols, and combinations thereof. Suitable alcohols include, but are not necessarily limited to methanol, ethanol, glycerol, and combinations thereof. Suitable glycols include, but are not necessarily limited to ethylene glycol, diethylene glycol, propylene glycol, and combinations thereof. Suitable lubricating and/or cleaning agents include, but are not necessarily limited to one or more surfactants. Suitable water repellant chemicals comprise hydrophobic chemical based fluids including, but not necessarily limited to solvent-based silicone compositions. One particular hydrophobic agent includes Polydimethylsiloxane ("PDMS"). A suitable hydrophobic chemical additive may also include soil repellant qualities. Optionally further still, the chemical reservoir 25 may include one or more colorants or dyes. Colorants are well known in the art of vehicular fluids. An exemplary colorant may include a blue or green color, but any color may be employed. Although not limited to a particular ratio, one suitable colorant may be added at a rate of less than 0.1% the total volume of fluid housed in the first compartment 20.

A suitable chemical reservoir assembly includes a chemical reservoir 25 with a fluid inlet 60 for adding chemical based fluids to the chemical reservoir 25 and a fluid outlet 62 in fluid communication with the control module 13 for delivery of chemical based fluids from the chemical reservoir 25 to control module 13. In one embodiment, the fluid outlet 62 may be provided as a fluid circulation member, e.g., a fluid pump, in fluid communication with the chemical reservoir 25 and first compartment 20. The chemical reservoir 25 may also include one or more fluid volume sensors 64 operationally configured to identify the fluid level in the chemical reservoir 25 over time—the one or more fluid volume sensors 64 being located at depths of the chemical reservoir 25 as desired according to fluid volume requirements of the system 10. As shown, the chemical reservoir assembly may also include a valve member 26 in fluid communication with the fluid outlet 62 that is (1) electronically communicated with the control circuitry 15 and (2) fluidly communicated with the control module 13 on its downstream end and with the chemical reservoir 25 on its upstream end. One particular valve member 26 may include a solenoid valve operationally configured to control fluid flow from the chemical reservoir 25 to the first compartment 20 (Directional Arrow B). The fluid inlet 60 suitably includes a sealable cover or cap that may be removed as desired to allow for adding of fluid to the chemical reservoir 25. One particular sealable cover may include a threaded twist cap as is common to vehicular reservoirs.

Similar as the control module 13, a suitable chemical reservoir 25 is constructed from materials including, but not necessarily limited to those materials resistant to chipping, cracking, excessive bending and reshaping as a result of ozone, weathering, heat, moisture, other outside mechanical and chemical influences, physical impacts, and combinations thereof. In addition, the inner surface of the chemical reservoir 25 may include one or more films or coatings resistant to chemical degradation. The chemical reservoir 25 is suitably constructed from materials including but not necessarily limited to metals, polymeric materials, fiberglass, plexiglass, filled composite materials, and combinations thereof and may comprise any color or combination of colors, or it may include one or more surfaces transparent or translucent. In one particular embodiment, the chemical reservoir 25 may be constructed from plastic. In another embodiment, the chemical reservoir 25 may be constructed from Acrylonitrile-Butadiene-Styrene ("ABS") thermoplastic.

For common automobile use, the volume of the chemical reservoir 25 may range from about 739.0 ml to about 2070.2 ml (about 25.0 ounces to about 70.0 ounces). In one particular embodiment, the chemical reservoir 25 may include a volume of about 1981.5 ml (67.0 ounces). It is also contemplated that an OE system 10 may incorporate a dual reservoir or split reservoir including two or more fluid storage compartments including a compartment for storing chemical based fluid(s) to be delivered to the first compartment 20 and a compartment for housing post-treatment fluid such as treated windshield wiper fluid. In one simplified example, a dual reservoir may include a first compartment operationally configured to hold up to about 2000 ml (67.6 ounces) of a chemical based fluid, e.g., an alcohol such as methanol, and a second compartment operationally configured to hold from about 1000 ml to about 2000 ml of treated fluid received from the first compartment 20.

Figure 7:
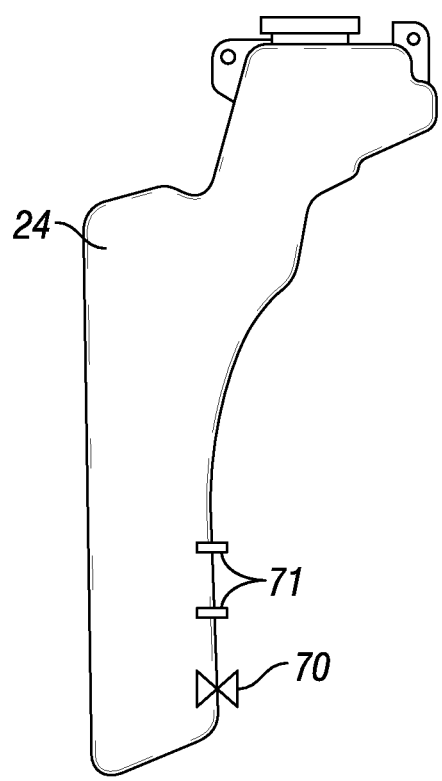
FIG. 7 is a simplified elevation view of a post-treatment fluid reservoir of the system.

In an OEM embodiment of the present system 10, one or more post-treatment reservoirs may be configured as desired. For example, in an embodiment including a post-treatment reservoir in the form of a vehicle's windshield washer fluid reservoir 24, the reservoir 24 may not only lie in fluid communication with the control module 13, but the reservoir 24 may also lie in electrical communication with the control circuitry 15 in a manner effective to change the composition of the fluid housed in the reservoir 24. As shown in the simplified embodiment of FIG. 7, the reservoir 24 may be provided with an outlet defined by a valve member 70 for releasing or discharging fluid from the reservoir 24. As understood by the skilled artisan, the valve member 70 is effective to release all fluid in the reservoir 24 that is above the valve member 70 but not below the valve member 70. As will be described below, when the valve member 70 is opened for release of a maximum amount of fluid, the volume of fluid remaining in the reservoir 24 may be factored as part of programmed calculation of the system 10 for determining the water/chemical additive ratio of the reservoir 24. In one particular embodiment, the valve member 70 may include a solenoid drain valve. As further shown in FIG. 7, the reservoir 24 may also include one or more fluid volume sensors 71 operationally configured to communicate the reservoir fluid level to the control circuitry 15 when calculating the time interval for setting the valve member 70 at an open position. It is further contemplated that the reservoir 24 may be equipped with a valve member 70 in the form of a solenoid valve having an adjustable electronic timer to allow emptying of fluid from the reservoir 24 for an adjustable period of time.

A power switch may also be incorporated into the system 10 as desired. Thus, in one aspect of operation the system 10 may be wholly automated, whereas incorporation of a power switch allows the system 10 to be controlled manually. The power switch may be selected from switches well known to those of ordinary skill in the art, including for example, bush-button switches, a toggle switches, rocker switches, and slide switches. Although the placement of the power switch may vary, the power switch is suitably located in convenient proximity to the vehicle operator in like manner as other vehicular control panel objects. In an automobile for example, the power switch may be located on the dashboard, driver side door panel, or middle seat console. In operation, the power switch allows the vehicle operator to selectively operate the system 10 as desired.

In operation, the control circuitry 15 is operationally configured to control various functions of the system 10, for example, the delivery of condensate through the valve member 45 to the first compartment 20 and the delivery of fluid to one or more post-treatment fluid reservoirs when one or more post-treatment reservoirs require refilling and when there is available fluid in the first compartment 20. For purposes of this application, the control circuitry 15 is also operationally configured to control the delivery of chemical based fluid from one or more chemical reservoirs 25 to the first compartment 20 according to one or more ambient temperature parameters and/or the volume of fluid available in the one or more chemical reservoirs 25.

Figure 8:
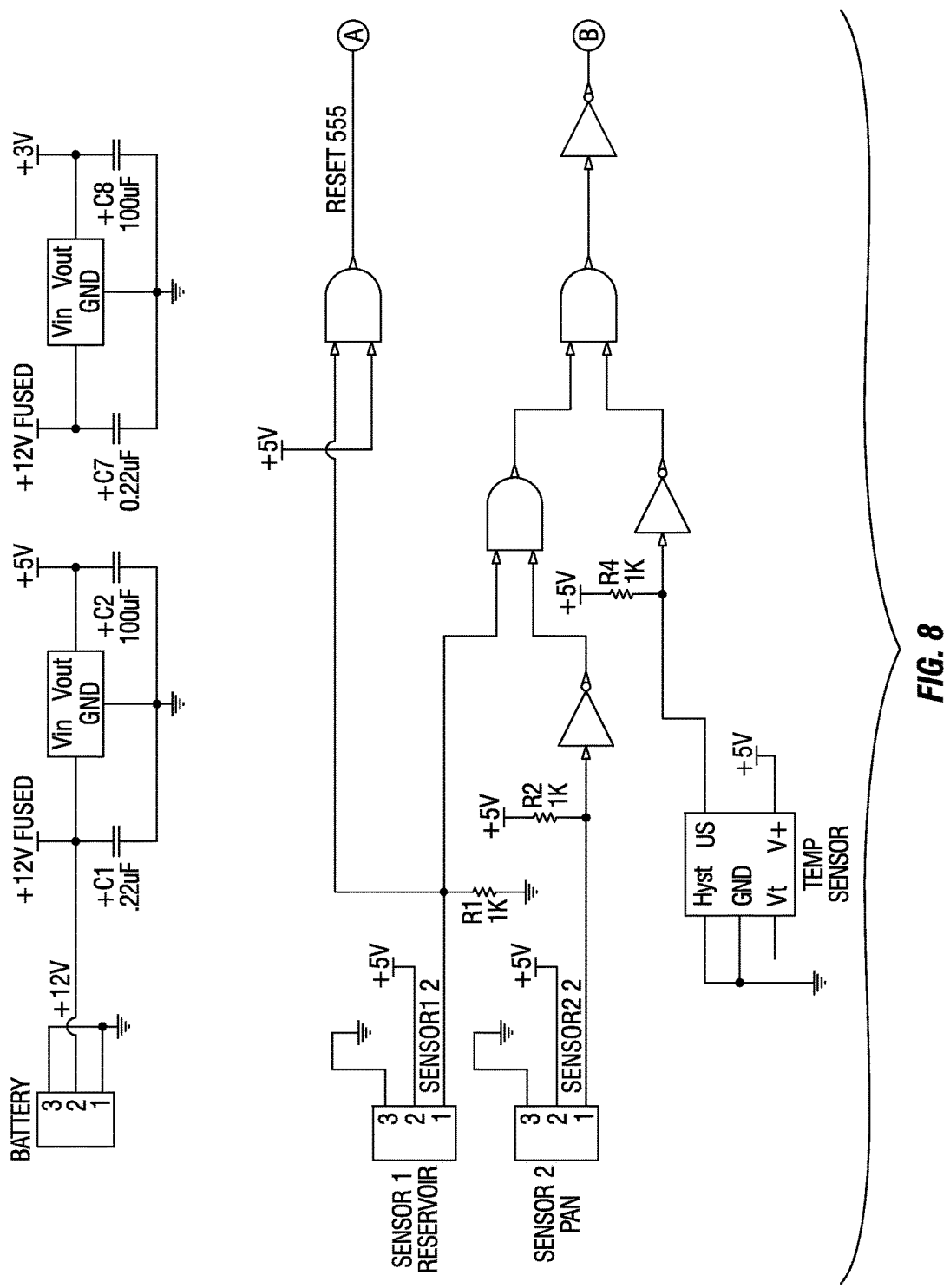
FIG. 8 is a first segment of an exemplary schematic of representative control circuitry of an embodiment of the system.
Figure 9:
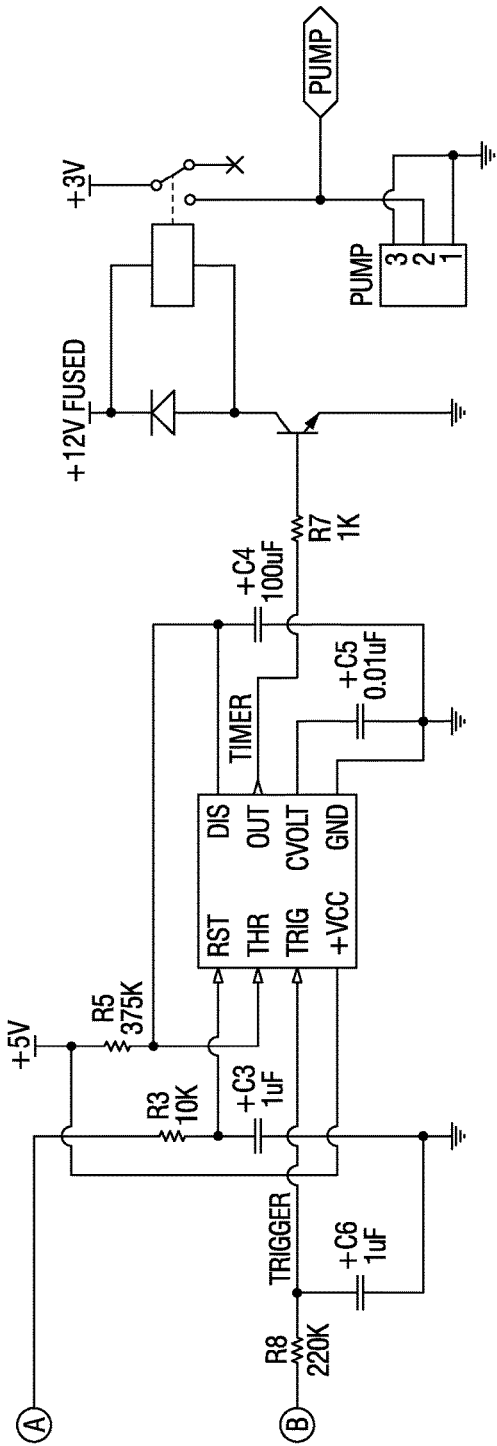
FIG. 9 is a second segment of the control circuitry of FIG. 8.
Figure 10:
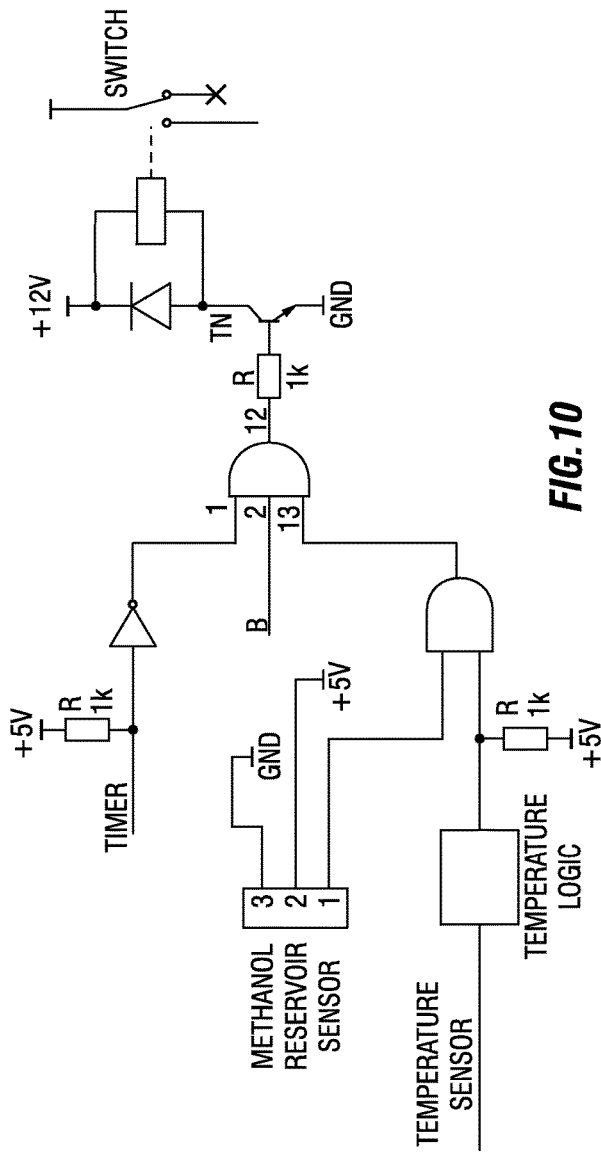
FIG. 10 is a third logic circuit of the control circuitry of FIGS. 8 and 9.

FIGS. 8-10 provide a schematic representation of control circuitry 15 as provided via a PCB. Control circuitry 15 may include the above mentioned components, as well as one or more fuses, an optional power switch, an optional temperature switch, an optional timer relay to delay pump 14 activation and/or determine the time for pump 14 operation once activated, flow switches and an optional operator signal, which in a particular embodiment may all lie in communication with a relay terminal. The fuses and switches include those known to persons skilled in electronic circuitry. With further reference to FIGS. 8-10, persons of ordinary skill in the art will appreciate the various relays of the control circuitry 15 to open and close in a manner effective to accomplish various functions according to the established ambient temperature parameters of the system 10 including, but necessarily limited to: (1) setting the pump 14 to an OFF position when both the first compartment 20 and post-treatment fluid reservoir 24 have sufficient fluid levels, (2) setting the pump 14 to an ON position when the first compartment 20 has an adequate amount of fluid and the post-treatment fluid reservoir 24 has an insufficient fluid level thereby activating the pump 14, (3) setting the pump 14 to an OFF position when both the first compartment 20 and post-treatment fluid reservoir 24 are substantially empty or have low or insufficient fluid levels, (4) setting the pump 14 to an OFF position when the first compartment 20 has a low or insufficient fluid level (or empty) and the post-treatment fluid reservoir 24 has a sufficient fluid level, (5) setting the pump 14 to an OFF position when the ambient temperature of the system drops to about freezing or below freezing and the chemical reservoir 25 is substantially empty, (6) setting the pump 62 (if present) to an ON position and the valve member 26 to an OPEN position to deliver fluid from the chemical reservoir 25 to the first compartment 20 when the first compartment 20 is substantially empty according to temperature settings of the system 10, (7) setting the valve member 45 to an OPEN position when the AC blower is on and/or the first compartment 20 is substantially empty and/or after chemical based fluid has been received into the first compartment 20 from the chemical reservoir 25, (8) setting the valve member 45 to an OFF position if the AC blower is off, (9) setting the valve member 70 to an OPEN position and (10) setting the main switch of the system 10 in an OFF position.

To provide an all-weather or all-season system 10 operational at temperatures ranging from subfreezing in the winter months up to temperatures above 37.0 degrees Celsius (98.6 degrees Fahrenheit) in the summer months, the chemical reservoir 25 may be provided with one or more antifreeze fluids that may be added to the captured condensate housed in the first compartment 20 in preparation for anticipated future drops in ambient temperature. In particular, the present system 10 may be provided as a dual mode system whereby the system 10 is operational (1) at temperatures above freezing even if the chemical reservoir 25 is empty and (2) at temperatures at freezing and below when the chemical reservoir 25 has adequate amounts of antifreeze fluid to be delivered to the first compartment 20. Without limiting the scope of use, a suitable temperature range for a system 10 on a vehicle operating in the Northern Hemisphere is from about −28.9 degrees Celsius to about 54.4 degrees Celsius (−20.0 degrees Fahrenheit to about 130.0 degrees Fahrenheit). As a simplified example, an automobile having the present system 10 installed therein is operable on the hottest days in places like Death Valley, Calif., United States of America and also places like Grand Forks, N.D., United States of America, where the average minimum temperature in the month of January is about −19.4 degrees Celsius (−3.0 degrees Fahrenheit) as of the time of this application. Furthermore, the present system 10 may be used at the above extreme low and high ambient temperatures even when a change from extreme to the other is realized in a rather short period of time, e.g., the same day.

In typical warm weather system 10 operation where the post-treatment reservoir 24 is a vehicular windshield wiper fluid reservoir, as the vehicle's A/C operates, condensate, i.e., water, drips or flows from the air conditioner evaporator and is delivered to the first compartment 20 for storage. Over time, as the vehicle user washes the vehicle's windshield with the windshield wiper fluid the fluid level in the reservoir 24 decreases. The pump 14 is turned to an ON position (1) if water in the first compartment 20 has risen to at least the level of the fluid volume sensor 5 wherein the sensor 5 indicates that the first compartment 20 is sufficiently full of condensate for delivery to the reservoir 24 and (2) when the fluid level within the reservoir 24 is below the uppermost fluid volume sensor 71 of the reservoir 24 indicating that the reservoir 24 is less than full or as otherwise programmed for refill purposes. Once the reservoir 24 is full of condensate received from the first compartment 20, the pump 14 is turned to an OFF position.

Following delivery of condensate to the windshield wiper fluid reservoir 24, the first compartment 20 is refilled with condensate only if the system 10 is still operating in warm weather, i.e., if the ambient temperature of the system 10 is above a preset trigger temperature. In operation, the system 10 opens the valve member 45 for a period of time until the first compartment 20 is suitably refilled with condensate according to the one or more fluid volume sensors 5 housed in the first compartment 20. Once the first compartment 20 is filled with condensate as programmed, the system 10 shuts the valve member 45 to an OFF position and any subsequent captured condensate suitably exits the system 10 via the outlet 18.

Suitably, if (1) the ambient system 10 temperature is below the warm weather range of the system 10 according the one or more preset trigger temperatures of the system 10 and (2) if the chemical reservoir 25 has sufficient fluid stored therein for delivery of fluid to the first compartment 20, the first compartment 20 may be refilled with a fluid mixture according to the ambient temperature of the system 10. Under this scenario, the system 10 is operationally configured to open the valve member 26 allowing a particular volume of chemical based fluid to flow out from the chemical reservoir 25 to the first compartment 20 according to system 10 programming. If the chemical reservoir 25 is empty, the system 10 will automatically shut off and remain off until the ambient temperature rises to a preset number of degrees above a maximum trigger temperature or until the chemical reservoir 25 is refilled with one or more chemical base fluids as desired.

In one particular mode of operation, the present system 10 is operationally configured to provide an antifreeze fluid in the first compartment 20 at a particular point in time prior to the vehicle, and the system 10, actually realizing freezing or subfreezing ambient temperatures corresponding to the antifreeze fluid's lowermost operable temperature. For example, the present system 10 may be operationally configured to measure the ambient temperature at a point in time during vehicle operation and if/when the measured ambient temperature falls to within a preset number of degrees of a preset trigger temperature, the system 10 is operationally configured to produce an antifreeze fluid in the first compartment 20 making antifreeze fluid available for delivery to one or more post-treatment reservoirs, e.g., a windshield wiper fluid reservoir, in advance of actual need or use of such antifreeze fluid. In another particular embodiment, the system 10 may be operationally configured to preset a plurality of trigger temperatures for delivery of one or more batches of chemical based fluids from the chemical reservoir 25 to the first compartment 20 allowing the antifreeze chemical concentration of the fluid in the first compartment 20 and post-treatment reservoir(s) to be adjusted as the vehicle realizes increasing drops in temperature over time and vice versa. In this regard, the system 10 is also operationally configured to empty or reduce the fluid volume in one or more post-treatment fluid reservoirs and replenish the one or more reservoirs with a reconstituted antifreeze fluid mixture according to anticipated drops in ambient temperature that may be realized by the vehicle. By providing an adequate antifreeze mixture in the first compartment 20 and/or the post-treatment reservoir(s) upon realizing one or more ambient temperature drops, the fluid mixture in the one or more post-treatment reservoirs of the vehicle effectively remains flowable for use at freezing and subfreezing temperatures.

In an embodiment where fluid stored in the one or more post-treatment reservoirs 24 is meant to be discharged there from for usage, e.g., as a windshield wiper fluid, as a potable water source, the system 10 may be programmed to discharge or empty the fluid out from the one or more post-treatment reservoirs as desired. For example, if a vehicle operator is not making use of the post-treatment reservoir fluid and a particular trigger temperature is realized, the system 10 may be operationally configured to discharge the fluid out from the one or more post-treatment fluid reservoirs, e.g., via valve 70, allowing the one or more post-treatment reservoirs to be refilled with a suitable antifreeze fluid composition according to the system 10 settings. Likewise, a potable water post-treatment reservoir may be emptied as desired to maintain a fresh water source therein. The total volume of fluid discharged at any one time may vary according to system 10 programming. For example, if the most recent batch of fluid sent to a post-treatment reservoir 24 included an antifreeze fluid, the control circuitry 15 may store the antifreeze composition of the most recent fluid batch conveyed to the post-treatment reservoir 24 and, according to the current volume of the fluid in the post-treatment reservoir 24, the system 10 may be operationally configured to discharge or dump a volume of fluid from the post-treatment reservoir necessary to provide a new antifreeze fluid mixture therein. As such, the system 10 is operationally programmed to provide a particular antifreeze mixture in the first compartment 20 to be added to the fluid in the post-treatment reservoir 24 effective to provide a desired antifreeze fluid mixture in the post-treatment reservoir 24 according to ambient temperature requirements.

In one embodiment, a first uppermost trigger temperature may be preset at any temperature as desired and all subsequent lower trigger temperatures may be set at constant intervals or irregular intervals as desired. For example, a second trigger temperature may be set at 5.0 degrees Fahrenheit lower than the initial first uppermost trigger temperature. A third trigger temperature may be set at 5.0 degrees Fahrenheit below the second trigger temperature, etc. In another embodiment, subsequent trigger temperature may be set at 2.0 degrees Celsius intervals or as otherwise desired. Because lower temperatures typically require more antifreeze chemicals to maintain a flowable fluid, the present system 10 is operationally configured to deliver increasing amounts of antifreeze fluid from the chemical reservoir 25 to the first compartment 20 at each subsequent lower trigger temperature. This is suitably accomplished via the system 10 opening the valve 26 of the chemical reservoir 25 for increasing time episodes at each batch allowing for more fluid to pass through valve 26 as each subsequent lower trigger temperature is realized.

In one simplified embodiment, a chemical reservoir 25 may be filled with an alcohol, e.g., methanol, for providing antifreeze properties to a fluid mixture deliverable to a windshield wiper fluid reservoir 24. In this simplified embodiment, for instructive purposes, the first compartment 20 may be provided having a maximum fluid volume of about 118.3 ml (4.0 ounces), the chemical reservoir 25 having a maximum fluid volume of about 1981.5 ml (67.0 ounces) and the windshield wiper fluid reservoir 24 having a maximum fluid volume of about 1981.5 ml (67.0 ounces). At ambient temperatures above about 7.2 degrees Celsius (45.0 degrees Fahrenheit), the system 10 may operate on captured condensate alone. If the chemical reservoir 25 is empty, the system 10 is suitably programmed to shut off once the ambient temperature reaches freezing temperatures of about 0.0 degrees Celsius (32.0 degrees Fahrenheit). Once the ambient air temperature sensor of the system 10 makes constant readings of ambient temperatures above about 7.2 degrees Celsius (45.0 degrees Fahrenheit) or greater for at least about two hours, the system 10 is operationally configured to resume operation. If the chemical reservoir 25 has fluid available for delivery to the first compartment 20 and if/when the ambient temperature reaches about 7.2 degrees Celsius (45.0 degrees Fahrenheit), the system 10 is operationally configured to deliver methanol from the chemical reservoir 25 to the first compartment 20 in an amount effective to produce a fluid mixture in the first compartment of about 10.0 percent methanol, i.e., a water to methanol ratio of about 9 to 1. In a simplified example, if the ambient trigger temperature requires a 10.0 percent methanol mixture in a first compartment 20 with a maximum fluid volume of about 118.3 ml (4.0 ounces), the system 10 is operationally configured to deliver about 11.8 ml (0.4 ounces) of methanol to the first compartment 20 prior to opening the valve member 45 to allow about 106.5 ml (3.6 ounces) of condensate to flow into the first compartment 20 from the drip pan 12. As an example, a water based fluid having about 10.0 percent methanol is suitable for use down to ambient temperatures of about −9.4 degrees Celsius (15.0 degrees Fahrenheit). As such, the fluid mixture provided in the first compartment 20, upon realizing the first upper trigger temperature, is effective for use at temperatures about 16.6 degrees Celsius (30.0 degrees Fahrenheit) less than the trigger temperature realized that produced the above described fluid mixture.

If/when the ambient temperature of the system 10 reaches −1.1 degrees Celsius (30.0 degrees Fahrenheit), i.e., a second trigger temperature, the system 10 is operationally configured to deliver methanol from the chemical reservoir 25 to the first compartment 20 in an amount effective to produce a fluid mixture in the first compartment 20 of about 15.0 percent methanol, i.e., a water to methanol ratio of about 8.5 to 1.5. This fluid mixture may be referred to herein as a "succeeding mixture" and the previous 10.0 percent methanol mixture may be referred to as the "subsequent mixture." If/when the ambient temperature of the system 10 reaches −9.4 degrees Celsius (15.0 degrees Fahrenheit), i.e., a third trigger temperature, the system 10 is operationally configured to deliver methanol from the chemical reservoir 25 to the first compartment 20 in an amount effective to produce a fluid mixture in the first compartment of about 20.0 percent methanol, i.e., a water to methanol ratio of about 4 to 1. If/when the ambient temperature of the system 10 reaches −17.8 degrees Celsius (0.0 degrees Fahrenheit), i.e., a fourth trigger temperature, the system 10 is operationally configured to deliver methanol from the chemical reservoir 25 to the first compartment 20 in an amount effective to produce a fluid mixture in the first compartment of about 25.0 percent methanol, i.e., a water to methanol ratio of about 3 to 1. If/when the ambient temperature of the system 10 reaches −26.1 degrees Celsius (−15.0 degrees Fahrenheit), i.e., a fifth trigger temperature, the system 10 is operationally configured to deliver methanol from the chemical reservoir 25 to the first compartment 20 in an amount effective to produce a fluid mixture in the first compartment of about 35.0 percent methanol, i.e., a water to methanol ratio of about 13 to 7. If/when the ambient temperature of the system 10 reaches −28.9 degrees Celsius (−20.0 degrees Fahrenheit), i.e., a sixth trigger temperature, the system 10 is operationally configured to deliver methanol from the chemical reservoir 25 to the first compartment 20 in an amount effective to produce a fluid mixture in the first compartment of about 45.0 percent methanol, i.e., a water to methanol ratio of about 11 to 9. If/when the ambient temperature of the system 10 reaches −31.7 degrees Celsius (−25.0 degrees Fahrenheit), i.e., a seventh trigger temperature, the system 10 is operationally configured to shut OFF even if methanol is available in the chemical reservoir 25 for delivery to the first compartment 20. The ultimate shut OFF lowermost trigger temperature of the system 10 may be preset according to one or more factors including, but not necessarily limited to the cost of chemical based fluids effective for use at extreme subfreezing temperatures, the amount of condensate that may be provided at extreme subfreezing temperatures where an automobile cabin temperature of about 18.3 degrees Celsius (65.0 degrees Fahrenheit) is typically required for an evaporator coil of an A/C assembly to produce an adequate amount of condensate for system 10 use.

In an embodiment where the ambient temperature remains at a substantially constant freezing or subfreezing trigger temperature, then after the initial fluid mixture is obtained in the first compartment 20 the system 10 is operationally configured to deliver a constant concentration of methanol from the chemical reservoir 25 to the first compartment 20 in a preset number of consecutive batches, e.g., three to five batches, in the event the system 10 is exposed to sudden increased drops in ambient temperature below the trigger temperature. Once the programmed number of batches are completed, and depending on whether the ambient temperature has dropped or risen, the system 10 may function as described above according to the one or more trigger temperatures.

Of further note, the automotive industry is making significant technological advancements in the area of automotive navigation systems. In general, automotive navigation systems receive signals from satellites and identify a vehicle's position and direction by combining that data with information obtained from various onboard vehicular sensors. For example, known automotive navigation systems (1) receive signals from satellites and detect a vehicle's location making use of a GPS ("global positioning system") antenna, (2) detect a vehicle's direction via a direction sensor, (3) detect a vehicle's travel distance via a speed sensor and (4) have map databases, all tied to a vehicle's navigation computer. The navigation system can check information received from the GPS antenna against the map database and display navigational information on an onboard display screen via the navigation system's control circuitry. Known navigation systems regularly have operating elements for inputting destination instructions. Moreover, they regularly have software for determining a respectively current vehicle location and for computing a travel route from the location to the input destination. A current location, in this context, is determined based on data from a satellite receiver, installed in the vehicle, for GPS satellite signals and frequently also from signals from, for example, gyro sensors or acceleration sensors, a speed signal or the like. In addition, these navigation systems also have output means for directing a driver along a computed travel route, travel direction instructions being mostly output as spoken instructions, especially turn-off instructions, and/or as a travel direction indication on a display. Accordingly, it is further contemplated that weather information at one or more locations, or vehicle destinations, may be regularly integrated into automotive navigation systems. In this regard, the present system 10 may also be electrically communicated with a vehicle's navigation system control circuitry. As a result, one or more anticipated temperatures at one or more travel locales/destinations may be communicated with the control circuitry 15 allowing a certain amount of antifreeze fluid to be delivered from the chemical reservoir 25 into the first compartment 20 at a particular time during travel along a particular route according to the vehicle's travel speed and travel distance from a most nearby locale/destination realizing a drop in ambient temperature that may be considered a trigger temperature for adjusting the antifreeze composition of the system 10 fluid.

The invention will be better understood with reference to the following non-limiting examples, which are illustrative only and not intended to limit the present invention to a particular embodiment.

Example 1

As of the date of this application, technology is available for use with automobile engines that involves injecting a methanol/water mixture into the engine intake manifold in a fine high pressure mist for increasing engine horsepower, increasing gas mileage and lowering emissions. As such, in a first non-limiting example of the system 10 operationally configured to capture condensate from an automobile A/C assembly, the system 10 may include a chemical reservoir 25 for storage and delivery of methanol to the first compartment 20 to provide a methanol/water mixture for delivery to an engine intake manifold for improving a vehicle's engine performance. The system 10 may also include another compartment as described above for housing a methanol/water fluid mixture for delivery to a windshield wiper fluid reservoir 24.

Example 2

In a second non-limiting example of a system 10 operationally configured to capture condensate from an automobile A/C assembly, the system 10 may include a chemical reservoir 25 for delivery of a chemical based fluid to the first compartment 20 for use in a vehicle's coolant system reservoir, e.g., radiator fluid reservoir. In this embodiment, the chemical reservoir 25 may be provided with one or more antifreeze based fluids as desired or as otherwise required according to realized and/or anticipated ambient temperatures and/or vehicular specifications.

Example 3

In a third non-limiting example of a system 10 operationally configured to capture condensate from an automobile A/C assembly, when operating at temperatures above about 7.2 degrees Celsius (45.0 degrees Fahrenheit) the system 10 may be characterized as shown in the simplified chart of FIG. 11. Suitably, the system 10 is operational using condensate alone, no chemical based fluids, at these temperatures.

Example 4

In a fourth non-limiting example of a system 10 operationally configured to capture condensate from an automobile A/C assembly, when operating at temperatures above about 1.7 degrees Celsius (35.0 degrees Fahrenheit) and below about 7.2 degrees Celsius (45.0 degrees Fahrenheit) the system 10 may be characterized as shown in the simplified chart of FIG. 12. Suitably, the system 10 is operational using condensate alone, no chemical based fluids, at these temperatures, but the system 10 starts sending chemical based fluids from the chemical reservoir 25 to the first compartment 20 at temperatures below about 7.2 degrees Celsius (45.0 degrees Fahrenheit).

Example 5

Figure 13:
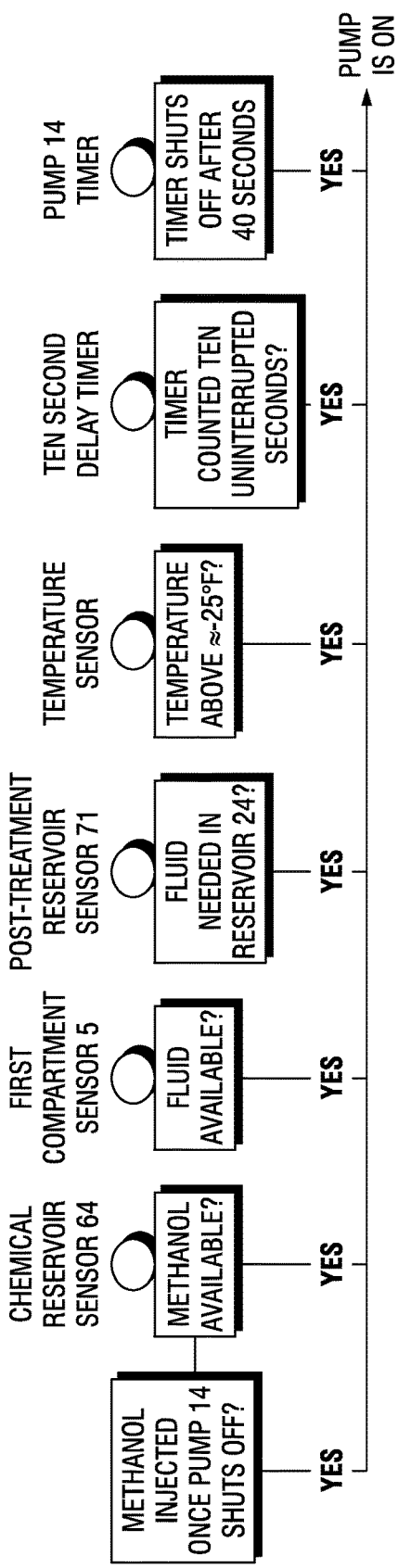
FIG. 13 is a simplified chart representative of a system operative at temperatures above about −31.7 degrees Celsius (−25.0 degrees Fahrenheit) and below about 1.7 degrees Celsius (35.0 degrees Fahrenheit) with antifreeze, e.g., methanol, available.

In a fifth non-limiting example of a system 10 operationally configured to capture condensate from an automobile A/C assembly, when operating at temperatures above about −31.7 degrees Celsius (−25.0 degrees Fahrenheit) and below about 1.7 degrees Celsius (35.0 degrees Fahrenheit), and with methanol available in the chemical reservoir 25 for delivery to the first compartment 20, the system 10 may be characterized as shown in the simplified chart of FIG. 13.

Example 6

Figure 14:
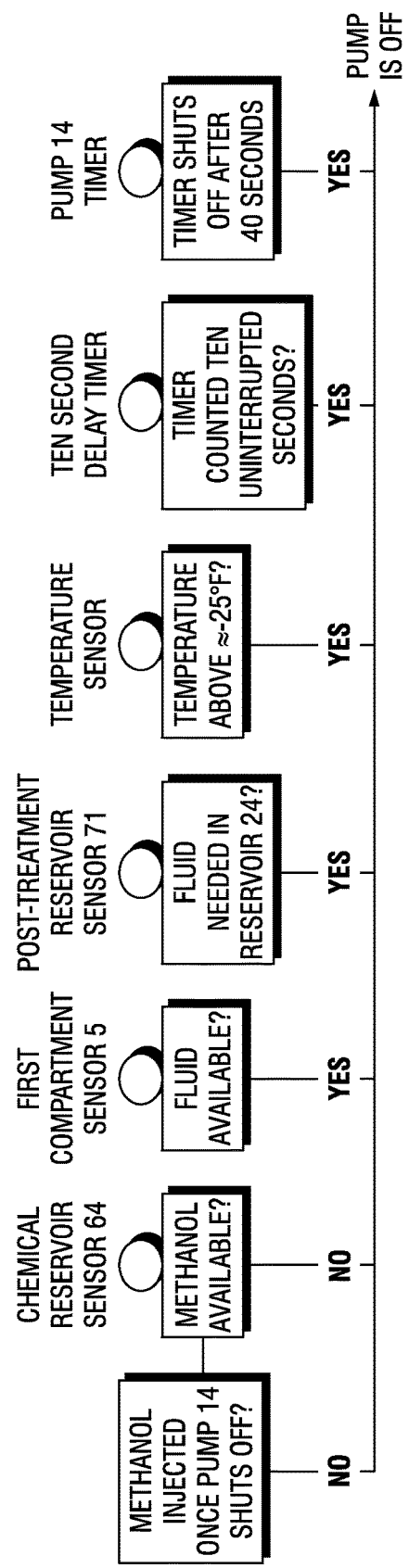
FIG. 14 is a simplified chart representative of a system operative at temperatures above about −31.7 degrees Celsius (−25.0 degrees Fahrenheit) and below about 1.7 degrees Celsius (35.0 degrees Fahrenheit) without antifreeze, e.g., methanol, available.

In a sixth non-limiting example of a system 10 operationally configured to capture condensate from an automobile A/C assembly, when operating at temperatures above about −31.7 degrees Celsius (−25.0 degrees Fahrenheit) and below about 1.7 degrees Celsius (35.0 degrees Fahrenheit), and with no methanol available in the chemical reservoir 25, the system 10 may be characterized as shown in the simplified chart of FIG. 14.

Example 7

In a seventh non-limiting example of a system 10 operationally configured to capture condensate from an automobile A/C assembly, when operating at temperatures below about −31.7 degrees Celsius (−25.0 degrees Fahrenheit), and with methanol available in the chemical reservoir 25, the system 10 may be characterized as shown in the simplified chart of FIG. 15.

Example 8

Figure 16A:
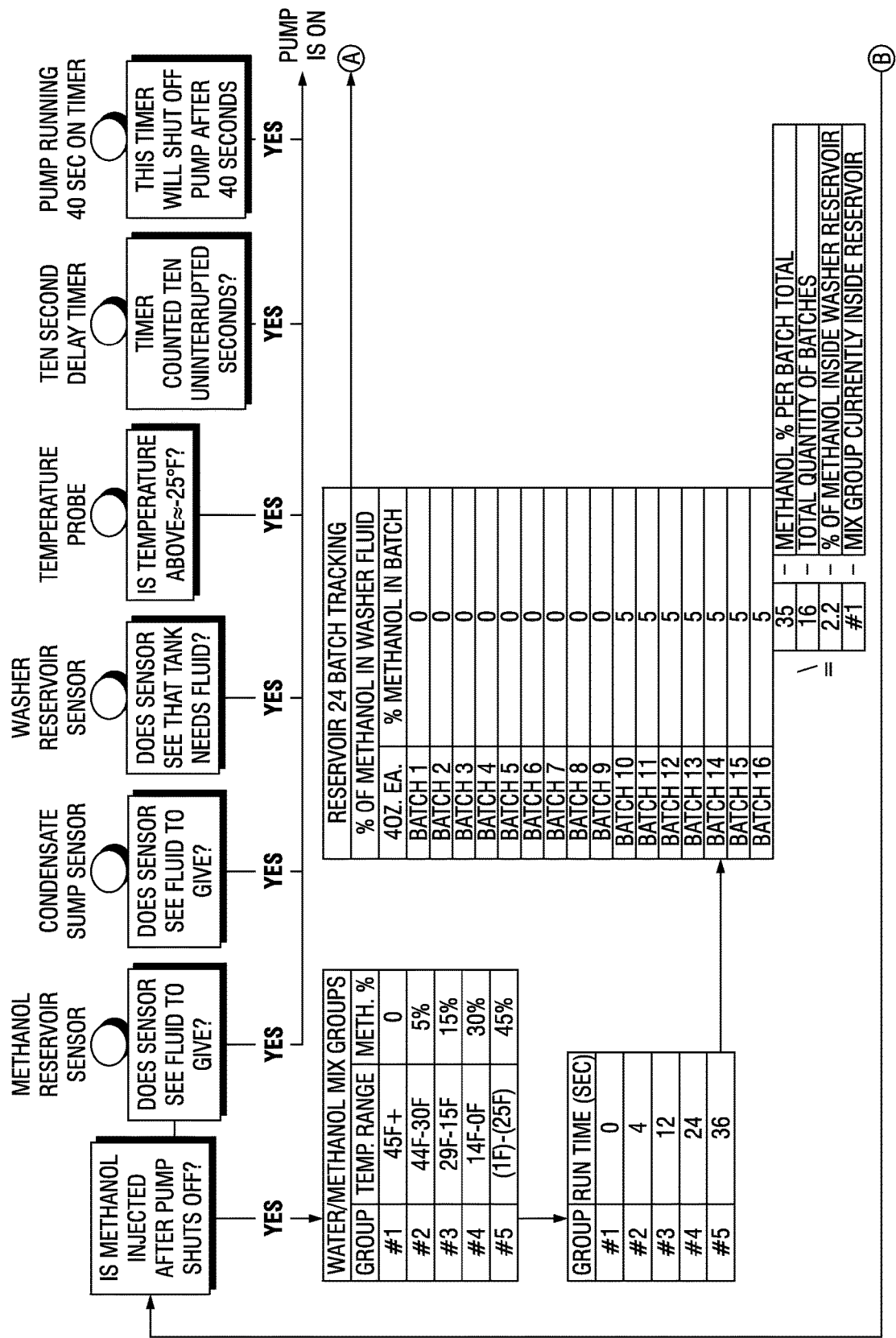
Figure 16B:
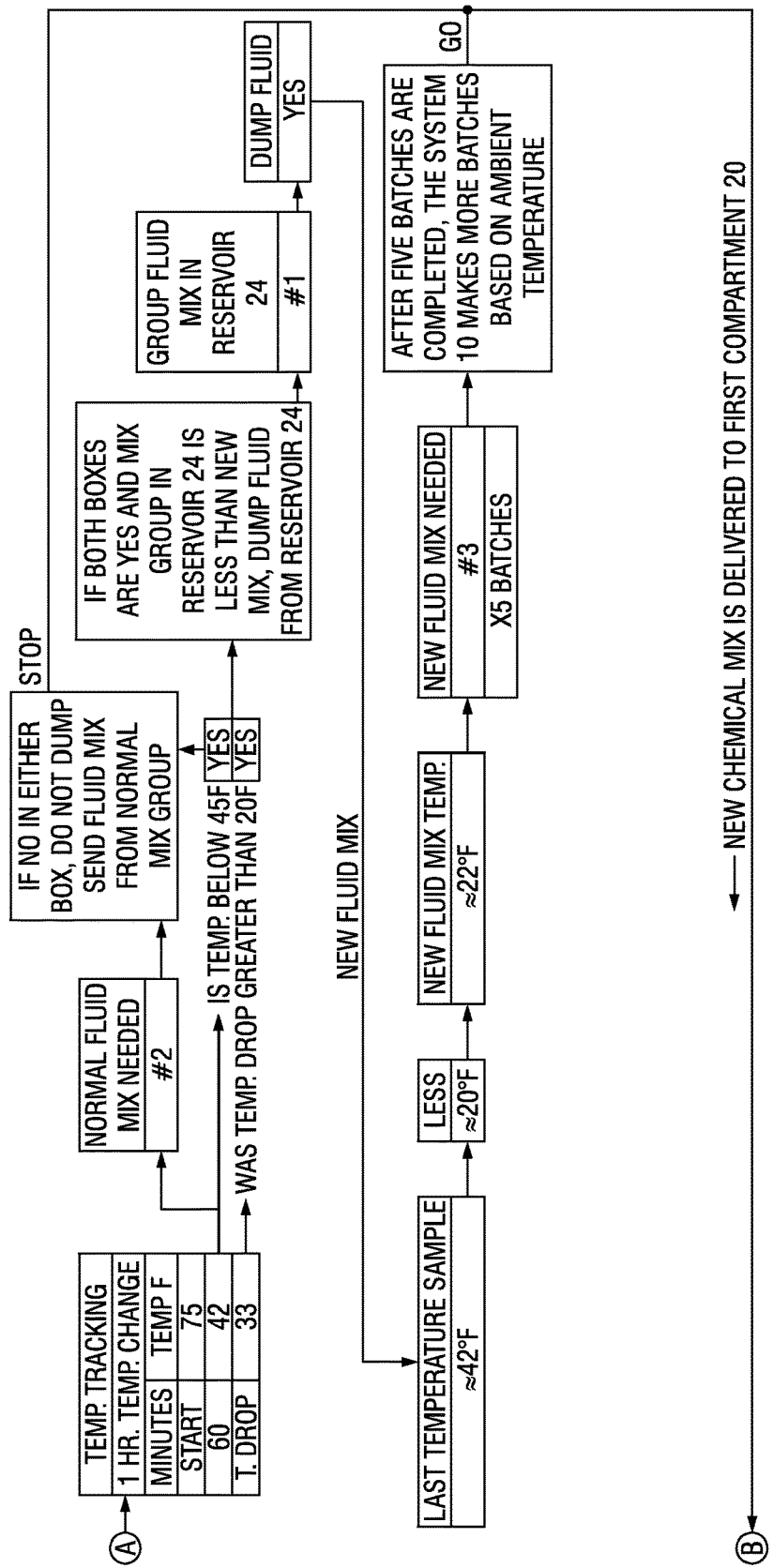
FIG. 16B is a continuation of the chart of FIG. 16A.

In an eighth non-limiting example of a system 10 operationally configured to capture condensate from an automobile A/C assembly, when operating at temperatures below about 7.2 degrees Celsius (45.0 degrees Fahrenheit) and above about −31.7 degrees Celsius (−25.0 degrees Fahrenheit), with methanol available in the chemical reservoir 25 for delivery to the first compartment 20 and with the fluid valve 70 operational to empty fluid from the vehicle's windshield washer fluid reservoir 24, the system 10 may be characterized as shown in the simplified chart depicted in FIGS. 16A and 16B.

Example 9

Figure 17A:
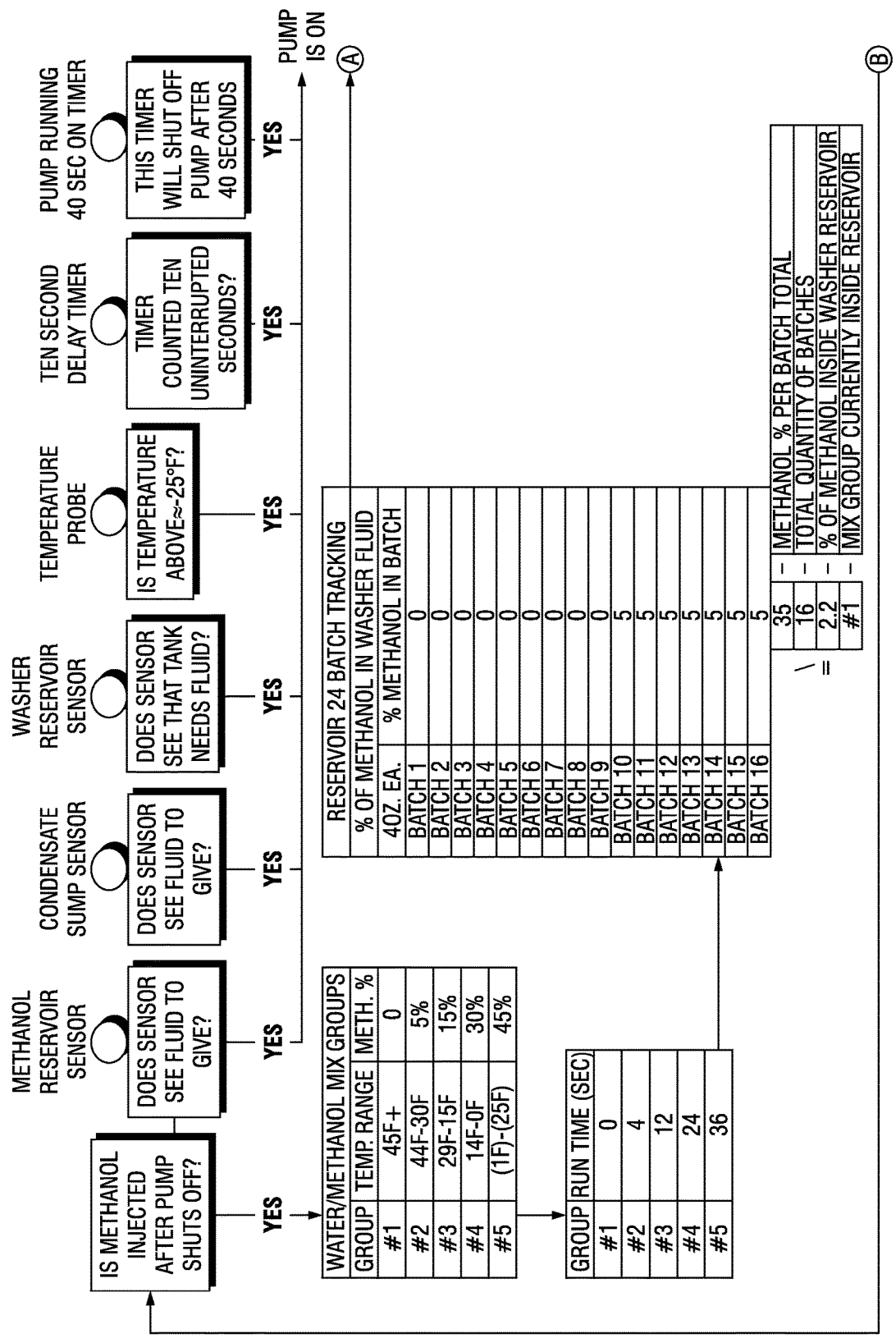
Figure 17B:
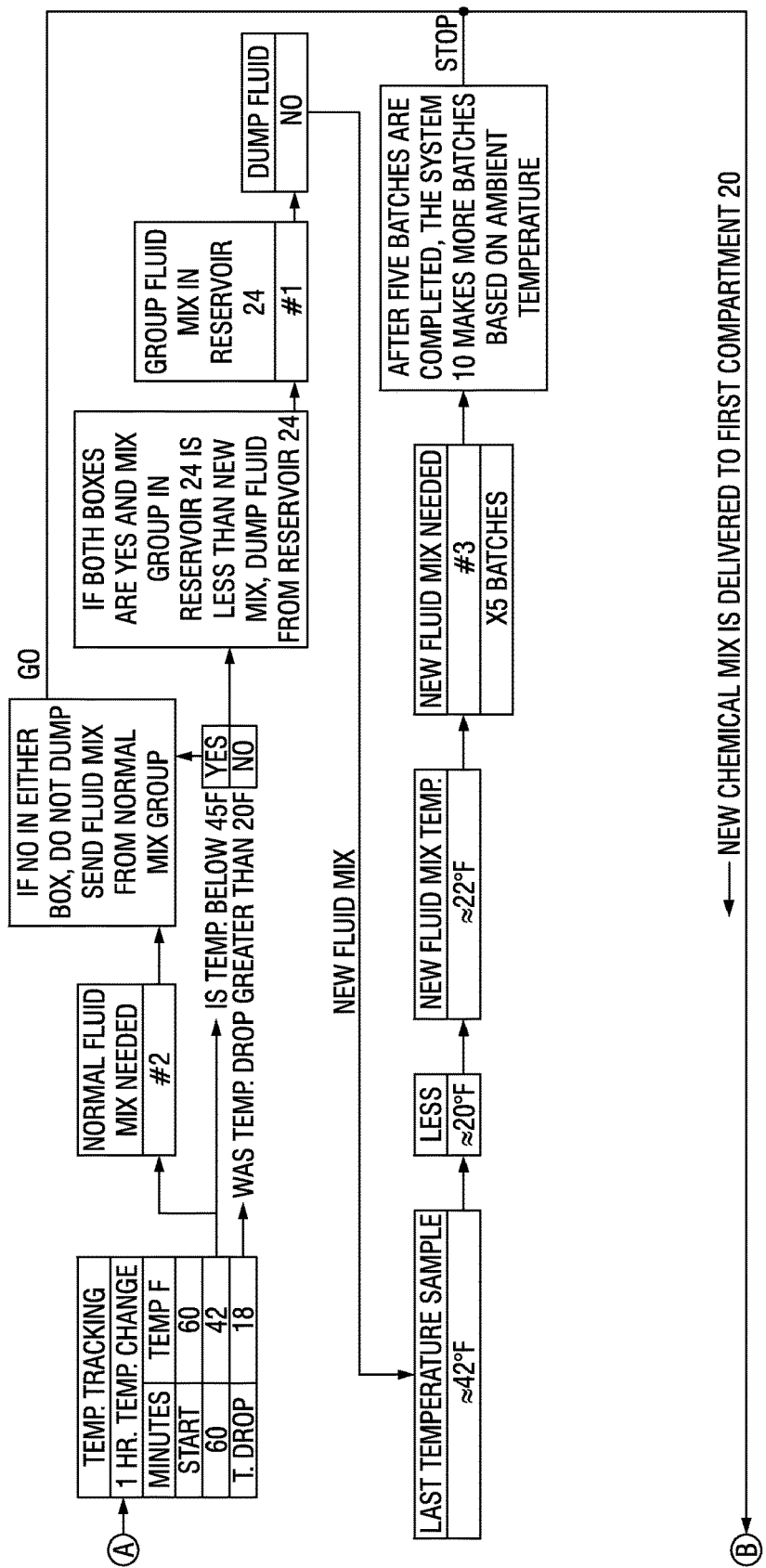
FIG. 17B is a continuation of the chart of FIG. 17A.

In a ninth non-limiting example of a system 10 operationally configured to capture condensate from an automobile A/C assembly, when operating at temperatures below about 7.2 degrees Celsius (45.0 degrees Fahrenheit) and above about −31.7 degrees Celsius (−25.0 degrees Fahrenheit), and with methanol available in the chemical reservoir 25 for delivery to the first compartment 20 and the fluid valve 70 not operational to empty fluid from the vehicle's windshield washer fluid reservoir 24, the system 10 may be characterized as shown in the simplified chart depicted in FIGS. 17A and 17B.

Example 10

In a tenth non-limiting example of a system 10 operationally configured to capture water condensate from an automobile A/C assembly, an automobile operating at ambient temperatures above about 7.2 degrees Celsius (45.0 degrees Fahrenheit) for a period of about five months is parked and shut OFF at an ambient temperature of about 18.3 degrees Celsius (65.0 degrees Fahrenheit) and not operated for a total of thirty days. The system 10 is operationally configured to record and save (1) the ambient temperature at the time the system 10 is shut OFF and (2) the fluid composition of the most recent fluid batch conveyed from the first compartment 20 to the windshield washer fluid reservoir 24. The average ambient temperature during the thirty days remains about 65.0 degrees Fahrenheit. On day thirty-one following the last operation of the automobile, the automobile is turned ON in an ambient temperature of about −1.1 degrees Celsius (30.0 degrees Fahrenheit). The system 10 is then ON and operationally configured to identify (1) the ambient temperature at start up compared to the ambient temperature at the most recent system 10 shut OFF, (2) the fluid level in the first compartment 20, (3) the fluid level in the chemical reservoir 25 and (4) the fluid level in the windshield washer fluid reservoir 24. Via an algorithm programmed into the control circuitry 15, the system 10 is operationally configured to calculate the volume of antifreeze fluid in the chemical reservoir 25 to transfer to the first compartment 20 to provide an antifreeze fluid mixture according to the system 10 ambient temperature settings, e.g., an antifreeze mixture usable at a minimum temperature of about −12.2 degrees Celsius (10.0 degrees Fahrenheit). The system 10 empties the windshield washer fluid reservoir 24 and refills the reservoir 24 with the antifreeze fluid mixture in the first compartment 20. The system 10 will provide a subsequent number of antifreeze fluid mixture batches, e.g., the following five batches, to safeguard the system 10 even if the ambient temperature of the system 10 rises above freezing.

Persons of ordinary skill in the art will recognize that many modifications may be made to the present application without departing from the spirit and scope of the invention. The embodiment(s) described herein are meant to be illustrative only and should not be taken as limiting the invention, which is defined in the claims.

I claim:

1. A system for processing fluid captured from a vehicle surface comprising:
    a fluid reservoir assembly for (1) capturing, storing and conveying fluid captured from the vehicle surface and (2) measuring the ambient temperature of the system, the fluid reservoir assembly having a first inlet for receiving fluid captured from a vehicle surface and a second inlet for receiving one or more chemical based fluids therein;
    a chemical reservoir assembly in fluid communication with the fluid reservoir assembly for storing one or more chemical based fluids and conveying a measurable volume of the one or more chemical based fluids to the fluid reservoir assembly via the second inlet to provide a fluid mixture therein according to one or more ambient temperatures of the system and the fluid volume of the fluid reservoir assembly;
    one or more post-treatment reservoir assemblies in fluid communication with the fluid reservoir assembly for receiving, storing and discharging fluid received from the fluid reservoir assembly; and
    control circuitry in electrical communication with a power source of the vehicle and with the fluid reservoir assembly, the chemical reservoir assembly and the one or more post-treatment reservoir assemblies, the control circuitry being operationally configured to safeguard the system against non-requested operation and provide one or more fluid mixtures according to the volume of fluid in each of the reservoirs and the ambient temperature of the system.

2. The system of claim 1 further including one or more heating elements operationally configured to heat the captured fluid.

3. The system of claim 1 wherein the system is in electrical communication with control circuitry of a vehicle navigation system of a vehicle.

4. The system of claim 3 wherein the vehicle navigation system includes weather information at one or more vehicle travel destinations.

5. The system of claim 1 wherein the chemical reservoir assembly includes a valve member in electrical communication with the control circuitry and in fluid communication with the second inlet of the fluid reservoir assembly.

6. The system of claim 1 further including a valve member at the first inlet of the fluid reservoir assembly that is electronically communicated with the control circuitry and operationally configured to prevent gaseous material from escaping out of the fluid reservoir assembly through the first inlet.

7. A system for processing fluid captured from a vehicle surface comprising:
   a fluid reservoir assembly operationally configured to capture and store captured fluid, the fluid reservoir assembly including (1) a fluid storage compartment including a first fluid inlet and a fluid valve at the first fluid inlet operationally configured to control the flow of fluid into the fluid storage compartment and prevent fluid flow out of the fluid storage compartment, (2) a fluid circulation member operationally configured to convey fluid out from the fluid storage compartment, (3) a fluid volume sensor system in electrical communication with the fluid circulation member and operationally configured to identify the fluid volume in the fluid storage compartment, (4) a temperature sensor for measuring the ambient temperature of the system, (5) a fluid outlet for conveying fluid out of the fluid reservoir assembly and (6) a second fluid inlet for receiving one or more chemical based fluids into the fluid storage compartment;
   a chemical reservoir assembly operationally configured to store one or more chemical based fluids and convey the same to the fluid storage compartment via the second fluid inlet, the chemical reservoir assembly having one or more fluid volume sensors operationally configured to identify the volume of the one or more chemical based fluids;
   a post-treatment reservoir assembly in fluid communication with the fluid reservoir assembly for receiving, storing and discharging fluid received from the fluid reservoir assembly, the post-treatment reservoir assembly having one or more fluid volume sensors operationally configured to identify the fluid volume within the post-treatment reservoir assembly; and
   control circuitry in electrical communication with the fluid reservoir assembly, chemical reservoir assembly and the post-treatment reservoir assembly, the control circuitry being operationally configured to safeguard the system against non-requested operation of the fluid reservoir assembly, chemical reservoir assembly according to the fluid volume of each of the reservoirs and the ambient temperature of the system;
   the system being powered by a power source originating from the vehicle.

8. The system of claim 7 wherein the system is in electrical communication with control circuitry of a vehicle navigation system of a vehicle.

9. The system of claim 8 wherein the vehicle navigation system includes weather information at one or more vehicle travel destinations.

10. The system of claim 7 wherein the chemical reservoir assembly includes a valve member in electrical communication with the control circuitry and in fluid communication with the second fluid inlet of the fluid reservoir assembly.

11. The system of claim 7 wherein the temperature sensor is provided as a chip on a printed circuit board housed within the fluid reservoir assembly.

12. The system of claim 7 wherein the temperature sensor is a factory provided ambient air temperature sensor of the vehicle.

13. A method of providing an antifreeze fluid mixture for vehicular use, comprising:
   providing an electrically powered system including (1) one or more downstream fluid reservoir assemblies providing fluid for vehicular use, (2) a first upstream fluid reservoir assembly for capturing and storing vehicular produced condensate, the first upstream fluid reservoir being in fluid communication with the one or more downstream fluid reservoir assemblies, (3) a second upstream fluid reservoir assembly in fluid communication with the first upstream fluid reservoir assembly for storing one or more antifreeze fluids, (4) an electrical system operationally configured to control fluid flow between the reservoirs of the assemblies according to the volume of fluid in each of the reservoirs and the ambient temperature of the system;
   capturing air conditioner condensate into the first upstream fluid reservoir via a first inlet of the first upstream fluid reservoir;
   upon the electrical system realizing one or more preset ambient trigger temperatures, when the second upstream fluid reservoir assembly has a requisite volume of one or more antifreeze fluids stored therein, the electrical system (1) directing the second upstream fluid reservoir assembly to convey a volume of one or more antifreeze fluids to the first upstream fluid reservoir assembly via a second inlet of the first upstream fluid reservoir to provide an antifreeze fluid mixture including condensate and (2) directing the one or more downstream fluid reservoir assemblies to discharge a volume of fluid; and
   conveying the antifreeze fluid mixture to the one or more downstream fluid reservoir assemblies.

14. The method of claim 13 further providing a vehicle navigation system in electrical communication with the electrically powered system.

15. The method of claim 14 where, in the providing a vehicle navigation system step, the vehicle navigation system may communicate one or more anticipated temperatures at one or more vehicular destinations with the electrical system of the electrically powered system allowing a certain amount of one or more antifreeze fluids to be delivered from the second upstream fluid reservoir assembly to the first upstream fluid reservoir assembly at a particular time during vehicular travel according to vehicular travel speed and vehicular travel distance from a vehicular destination according to the one or more preset ambient trigger temperatures.

16. The method of claim 13 where in the directing step, the volume of one or more antifreeze fluids conveyed to the first upstream fluid reservoir assembly increases at each subsequent lower trigger temperature of the one or more preset ambient trigger temperatures.

17. The method of claim 13, where in the providing step, the electrically powered system includes a valve member at the first inlet of the first upstream fluid reservoir assembly that is electronically communicated with the electrical system and operationally configured to prevent vehicular produced condensate from entering the first upstream fluid reservoir assembly through the first inlet when the ambient temperature of the system is at freezing or below and there is an insufficient amount of one or more antifreeze fluids in the second upstream fluid reservoir assembly.

* * * * *